(12) United States Patent
Horn et al.

(10) Patent No.: US 9,094,986 B2
(45) Date of Patent: Jul. 28, 2015

(54) SYNCHRONOUS AND ASYNCHRONOUS INTERFERENCE MANAGEMENT

(75) Inventors: Gavin Bernard Horn, La Jolla, CA (US); Ashwin Sampath, Princeton, NJ (US); Sanjiv Nanda, Ramona, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 840 days.

(21) Appl. No.: 12/027,849

(22) Filed: Feb. 7, 2008

(65) Prior Publication Data

US 2009/0203372 A1 Aug. 13, 2009

(51) Int. Cl.
| | |
|---|---|
| H04W 4/00 | (2009.01) |
| H04W 72/08 | (2009.01) |
| H04W 16/14 | (2009.01) |
| H04W 72/04 | (2009.01) |
| H04W 74/08 | (2009.01) |

(52) U.S. Cl.
CPC ............ *H04W 72/082* (2013.01); *H04W 16/14* (2013.01); *H04W 72/0406* (2013.01); *H04W 74/08* (2013.01)

(58) Field of Classification Search
CPC .......... H04W 72/082; H04W 72/0406; H04W 74/08; H04W 16/14; H04W 28/04
USPC ......... 370/242, 321, 328, 336, 337, 345, 347; 455/63.1, 63.2, 63.3, 114.2, 296
See application file for complete search history.

(56) References Cited

U.S. PATENT DOCUMENTS

| | | |
|---|---|---|
| 5,528,597 A | 6/1996 | Gerszberg et al. |
| 5,649,303 A | 7/1997 | Hess et al. |
| 5,697,059 A | 12/1997 | Carney |
| 5,862,452 A | 1/1999 | Cudak et al. |
| 5,956,642 A | 9/1999 | Larsson et al. |

(Continued)

FOREIGN PATENT DOCUMENTS

| | | |
|---|---|---|
| CN | 1192300 A | 9/1998 |
| CN | 1266600 A | 9/2000 |

(Continued)

OTHER PUBLICATIONS

Hui Ma et al, PHY/MAC Adaptation Approaches for Dense Wireless LAN MESH, Jan. 6, 2008.*

(Continued)

*Primary Examiner* — Ricky Ngo
*Assistant Examiner* — Wei-Po Kao
(74) *Attorney, Agent, or Firm* — Joseph S. Hanasz

(57) ABSTRACT

Interference management may involve the transmission of interference management messages by wireless nodes that are experiencing interference and appropriate responses by potential interferers that receive the interference management messages. Upon detection of interfering signals, a wireless node may determine whether the signals are from a synchronous interferer or an asynchronous interferer. Based on this determination, the wireless node may use different types of signals to manage the different types of interference. In some aspects, asynchronous interference management may involve backing-off in frequency and/or in time in response to interference signals. Asynchronous interference management may involve transmitting back-off beacons to clear potential interferers from a given carrier. Here, the transmission of beacons by a wireless node may be metered to facilitate fair sharing of communication resources.

88 Claims, 15 Drawing Sheets

(56) References Cited

U.S. PATENT DOCUMENTS

| | | | |
|---|---|---|---|
| 6,041,238 A | 3/2000 | Tanoue | |
| 6,058,106 A | 5/2000 | Cudak et al. | |
| 6,069,883 A | 5/2000 | Ejzak et al. | |
| 6,088,335 A | 7/2000 | I et al. | |
| 6,195,554 B1 | 2/2001 | H'mimy et al. | |
| 6,256,477 B1* | 7/2001 | Eidson et al. | 455/63.3 |
| 6,366,566 B1* | 4/2002 | Scott | 370/280 |
| 6,480,558 B1 | 11/2002 | Ottosson et al. | |
| 6,850,504 B1 | 2/2005 | Cao et al. | |
| 6,885,656 B2 | 4/2005 | Sashihara | |
| 6,920,171 B2 | 7/2005 | Souissi et al. | |
| 6,941,110 B2 | 9/2005 | Kloper et al. | |
| 7,130,586 B2 | 10/2006 | Corbett et al. | |
| 7,158,505 B2 | 1/2007 | Dick et al. | |
| 7,274,945 B2 | 9/2007 | Backes et al. | |
| 7,302,379 B2 | 11/2007 | Cioffi et al. | |
| 7,321,587 B2 | 1/2008 | Gao et al. | |
| 7,342,876 B2 | 3/2008 | Bellur et al. | |
| 7,366,202 B2 | 4/2008 | Scherzer et al. | |
| 7,443,829 B2* | 10/2008 | Rizvi et al. | 370/342 |
| 7,636,551 B2 | 12/2009 | Ue et al. | |
| 7,653,357 B2 | 1/2010 | Matsuo et al. | |
| 7,664,465 B2 | 2/2010 | Shen et al. | |
| 7,675,840 B1 | 3/2010 | Prismantas et al. | |
| 7,816,275 B1 | 10/2010 | Fuller et al. | |
| 7,876,837 B2 | 1/2011 | Khawand et al. | |
| 7,907,950 B2 | 3/2011 | Ihm et al. | |
| 8,072,938 B2 | 12/2011 | Lee et al. | |
| 2002/0041584 A1 | 4/2002 | Sashihara | |
| 2004/0032847 A1 | 2/2004 | Cain | |
| 2004/0203474 A1* | 10/2004 | Miller et al. | 455/69 |
| 2005/0002364 A1 | 1/2005 | Ozer et al. | |
| 2005/0058151 A1 | 3/2005 | Yeh | |
| 2005/0091371 A1 | 4/2005 | Delegue et al. | |
| 2005/0270969 A1* | 12/2005 | Han et al. | 370/210 |
| 2006/0092881 A1* | 5/2006 | Laroia et al. | 370/331 |
| 2006/0116081 A1 | 6/2006 | Shah | |
| 2006/0146721 A1 | 7/2006 | Attar et al. | |
| 2007/0060057 A1* | 3/2007 | Matsuo et al. | 455/63.1 |
| 2007/0082616 A1* | 4/2007 | Bird | 455/63.1 |
| 2007/0105574 A1 | 5/2007 | Gupta et al. | |
| 2007/0105576 A1 | 5/2007 | Gupta et al. | |
| 2008/0008138 A1 | 1/2008 | Pun | |
| 2008/0031172 A1 | 2/2008 | Nanda et al. | |
| 2009/0036083 A1* | 2/2009 | Darwood | 455/296 |
| 2009/0067448 A1* | 3/2009 | Stanwood et al. | 370/447 |
| 2009/0170542 A1* | 7/2009 | Chen et al. | 455/501 |
| 2009/0176454 A1 | 7/2009 | Chen et al. | |
| 2009/0203320 A1 | 8/2009 | Horn et al. | |
| 2009/0203322 A1 | 8/2009 | Horn et al. | |

FOREIGN PATENT DOCUMENTS

| | | | |
|---|---|---|---|
| CN | 1748371 A | 3/2006 | |
| CN | 1757250 A | 4/2006 | |
| CN | 1886919 A | 12/2006 | |
| EP | 0865172 A2 | 9/1998 | |
| EP | 1509011 A2 | 2/2005 | |
| EP | 1855424 A1 | 11/2007 | |
| FR | 1734711 A1 | * 12/2006 | |
| JP | 6338854 A | 12/1994 | |
| JP | 07067169 | 3/1995 | |
| JP | 2001145155 A | 5/2001 | |
| JP | 2002118875 A | 4/2002 | |
| JP | 2005505954 A | 2/2005 | |
| JP | 2006013820 A | 1/2006 | |
| JP | 2006067519 A | 3/2006 | |
| JP | 2007074355 A | 3/2007 | |
| JP | 4927531 | 2/2012 | |
| KR | 100343487 B1 | 6/2002 | |
| WO | WO02091597 | 11/2002 | |
| WO | WO2004077709 | 9/2004 | |
| WO | WO2004084509 | 9/2004 | |
| WO | WO2005107292 A1 | 11/2005 | |
| WO | WO2007046758 | 4/2007 | |

OTHER PUBLICATIONS

European Search Report—EP10151215, Search Authority—Berlin Patent Office, Oct. 11, 2010.

Hui Ma et al: "PHY/MAC adaptation approaches for dense wireless LAN MESH" Communication Systems Software and Middleware and Workshops, 2008. Comsware 2008. 3rd International Conference on, IEEE, Piscataway, NJ, USA, Jan. 6, 2008, pp. 204-207, XP031279672 ISBN: 978-1-4244-1796-4 Section II, Chapter 2.1.

International Search Report and Written Opinion—PCT/US2009/032979, International Search Authority—European Patent Office—Jun. 5, 2009.

European Search Report—EP08006296—Search Authority—Munich—Apr. 24, 2009.

Kuzminskiy et al., "Cross-Layer Design of Uplink Multiple-Antenna Interference Cancellation for WLAN with CSMA/CA in Open Access Networks", ICC '07, pp. 2568-2573, Jun. 24-28, 2000.

Taiwan Search Report—TW098103950—TIPO—Apr. 15, 2012.

* cited by examiner

SYNCHRONOUS AND ASYNCHRONOUS INTERFERENCE MANAGEMENT

CROSS-REFERENCE TO RELATED APPLICATIONS

This application is related to concurrently filed and commonly owned U.S. patent application Ser. No. 12/027,794, entitled "ASYNCHRONOUS INTERFERENCE MANAGEMENT," and U.S. patent application, entitled "ASYNCHRONOUS INTERFERENCE MANAGEMENT BASED ON TIMESLOT OVERLAP," and Ser. No. 12/027,877 the disclosure of each of which is hereby incorporated by reference herein.

BACKGROUND

1. Field

This application relates generally to wireless communication and more specifically, but not exclusively, to managing asynchronous interference.

2. Introduction

A wireless communication system may implement an interference management scheme to mitigate interference caused by neighboring wireless devices. For example, in a cellular system, wireless transmissions of a cell phone or a base station of a first cell may interfere with communication between a cell phone and a base station of a neighboring cell. Similarly, in a Wi-Fi network, wireless transmissions of an access terminal or an access point of a first service set may interfere with communication between an access terminal and a base station of a neighboring service set.

A synchronous communication system may use synchronous interference management messages to control interference on a given channel. Here, the wireless devices in the system may transmit such messages or monitor for such messages at designated times within certain timeslots on the channel. Thus, a wireless device that is receiving data during an upcoming timeslot may transmit a message to request that potential interferers abstain from transmitting during that timeslot. Conversely, a potential interferer may monitor the channel at the designated times to determine whether it should abstain from transmitting during an upcoming timeslot. Although such a scheme may be effective for controlling interference between devices that are synchronized with one another, such a scheme may be ineffective in controlling interference between wireless devices that are not synchronized. For example, in such a case, a potential interferer may not be monitoring the channel when another device is transmitting its interference management messages.

An asynchronous communication system may employ techniques such as carrier sense multiple access to control interference on a given channel. In this case, before transmitting on the channel, each wireless device may verify that the channel is not being used by any other wireless device. In practice, however, such interference mitigation techniques may lead to poor utilization, limited fairness control, and susceptibility to hidden and exposed nodes.

SUMMARY

A summary of sample aspects of the disclosure follows. It should be understood that any reference to the term aspects herein may refer to one or more aspects of the disclosure.

The disclosure relates in some aspects to managing interference associated with wireless communication. Here, interference management may involve, for example, the transmission of interference management messages by wireless nodes that are experiencing interference and appropriate responses by potential interferers that receive the interference management messages.

In some aspects, upon detection of interfering signals, a wireless node may determine whether the interferer is a synchronous interferer or an asynchronous interferer. In the former case, the wireless node may transmit synchronous interference management messages in an attempt to mitigate the synchronous interference. In the latter case, the wireless node may transmit asynchronous interference management messages in an attempt to mitigate the asynchronous interference.

In some aspects asynchronous interference management may involve backing-off in frequency and/or in time in response to interference signals. For example, through the use of multiple independent carriers, a wireless node may elect to operate on a different carrier to avoid potential interference on a given carrier. Alternatively or in addition, the wireless node may elect to use time division multiplexing on a carrier. For example, the node may elect to only use one portion of a timeslot to avoid potential interference on another portion of the timeslot.

In some aspects asynchronous interference management may involve transmitting back-off beacons to clear potential interferers from a given carrier. In this case, the transmission of beacons by each wireless node may be metered to facilitate fair sharing of communication resources. For example, a decision by a wireless node to transmit a beacon may be based on that wireless node's entitlement to a share of the resources of a communication system. Here, each wireless node in the system may repeatedly transmit signals indicative of that wireless node's quality of service requirements. A given wireless node may thereby determine its share of the resources based on that wireless node's quality of service requirements and the quality of service requirements of all currently active neighboring wireless nodes.

BRIEF DESCRIPTION OF THE DRAWINGS

These and other sample aspects of the disclosure will be described in the detailed description and the appended claims that follow, and in the accompanying drawings, wherein:

Figure 1:
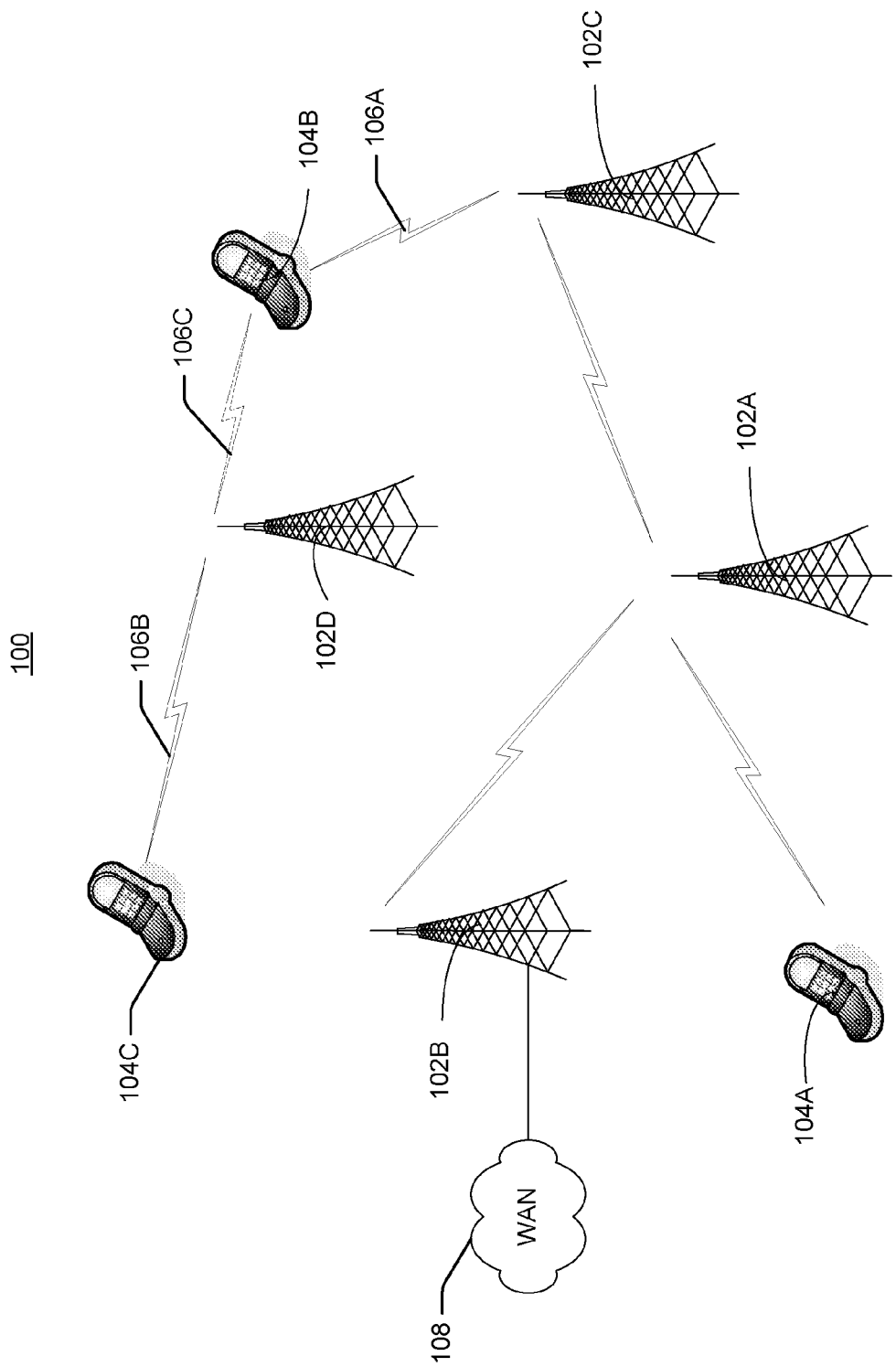
FIG. 1 is a simplified diagram of several sample aspects of a communication system.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim. As an example of the above, in some aspects a method of wireless communication comprises identifying asynchronous interference, determining a share of resources to use based on the identified asynchronous interference, and reserving resources based on the determined share of resources. In addition, in some aspects the determination of the share of resources is based on a local activity factor of a wireless node and at least one activity factor received from at least one other wireless node.

FIG. 1 illustrates several sample aspects of a wireless communication system 100. The system 100 includes several wireless nodes, generally designated as nodes 102 and 104. A given node may receive and/or transmit one or more traffic flows (e.g., data flows) via one or more communication channels (e.g., where a given channel may be associated with a given carrier). For example, each node may comprise at least one antenna and associated receiver and transmitter components. In the discussion that follows the term receiving node may be used to refer to a node that is receiving and the term transmitting node may be used to refer to a node that is transmitting. Such a reference does not imply that the node is incapable of performing both transmit and receive operations.

A node may be implemented in various ways. For example, in some implementations a node may comprise an access terminal, an access point, or some other network-related component. Referring to FIG. 1, the nodes 102 may comprise access points or relay points and the nodes 104 may comprise access terminals. The nodes 102 may thus facilitate communication between other nodes of a network (e.g., a Wi-Fi network, a cellular network, or a WiMax network). For example, when an access terminal (e.g., an access terminal 104A) is within a coverage area of an access point (e.g., an access point 102A) or a relay point, the access terminal 104A may thereby communicate with another device of the system 100 or some other network that is coupled to communicate with the system 100. Here, one or more of the nodes (e.g., node 102B) may comprise a wired access point that provides connectivity to another network or networks (e.g., a wide area network 108 such as the Internet).

In some aspects two or more nodes of the system 100 (e.g., nodes of a common independent service set) associate with one another to establish traffic flows between the nodes via one or more communication links. For example, an access terminal 104B and an access point 102C may associate with one another such that one or more traffic flows are established between nodes 104B and 102C.

In some cases, wireless transmissions from a node in the system 100 may interfere with reception at a non-associated node in the system 100. For example, the node 104B may be receiving from the node 102C (as represented by a wireless communication symbol 106A) at the same time that a node 102D is transmitting to a node 104C (as represented by a symbol 106B). Depending on the distance between the nodes 104B and 102D and the transmission power and timing of the node 102D, transmissions from the node 102D (as represented by a dashed symbol 106C) may interfere with reception at the node 104B.

Figure 2:
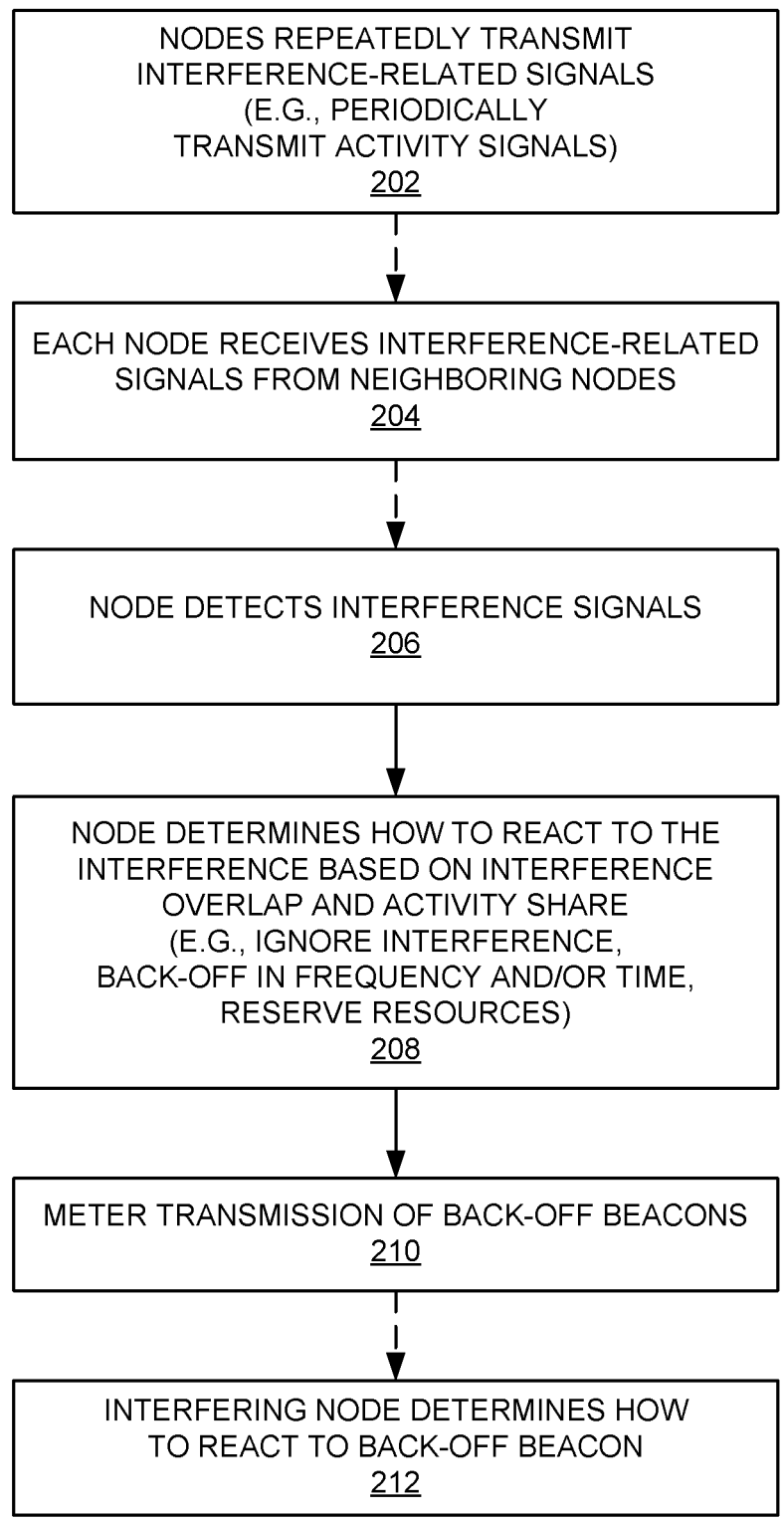
FIG. 2 is a flowchart of several sample aspects of operations that may be performed to manage interference.

The discussion that follows describes various techniques that may be employed in conjunction with managing (e.g., mitigating) interference. FIG. 2 provides an overview of several aspects of an interference management scheme. In particular, this flowchart describes operations where a node may manage interference by backing off in frequency or in time, or by reserving resources through the use of a back-off beacon. Here, the transmission of back-off beacons may be metered based on the relative quality of service requirements of the node and its neighboring nodes.

Figure 3:
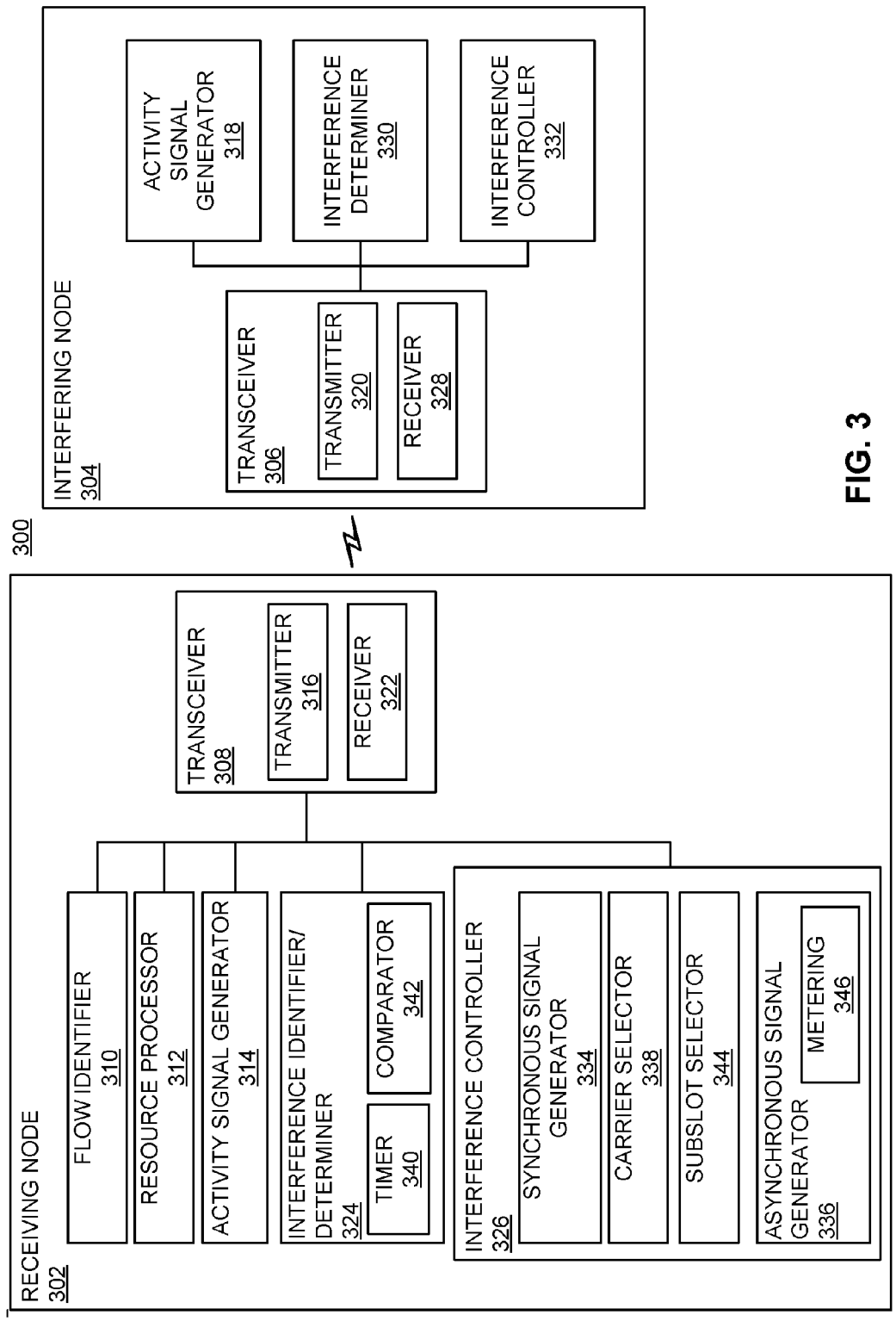
FIG. 3 is a simplified block diagram of several sample aspects of sample components of a communication system.

FIG. 3 describes several representative components than may be incorporated into wireless devices to facilitate interference management. In this example, unassociated nodes 302 and 304 are close enough to one another whereby transmissions by a transceiver 306 of the node 304 may interfere with reception at a transceiver 308 of the node 302. Accordingly, for purposes of discussion, the node 302 may be referred to herein as a receiving node and the node 304 may be referred to herein as an interfering node. It should be appreciated that the nodes 302 and 304 will perform transmit and receive operations other than those described herein. In addition, it should be appreciated that either of the nodes 302 and 304 may comprise an access terminal, an access point, or some other type of node.

Figure 4:
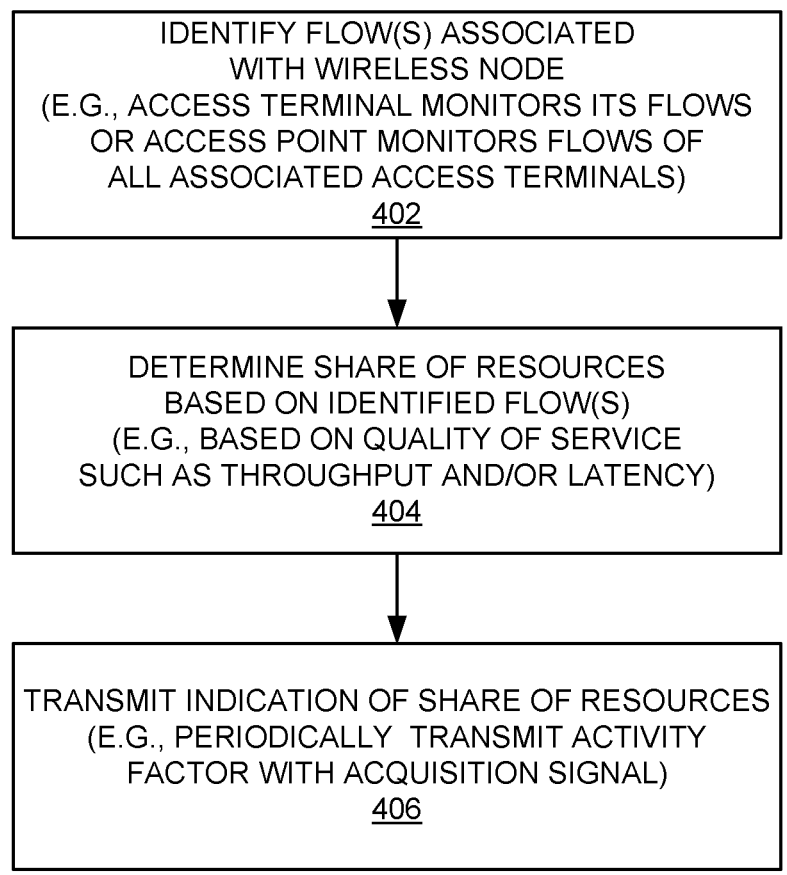
FIG. 4 is a flowchart of several sample aspects of operations that may be performed to provide an indication of a share of resources.
Figure 5:
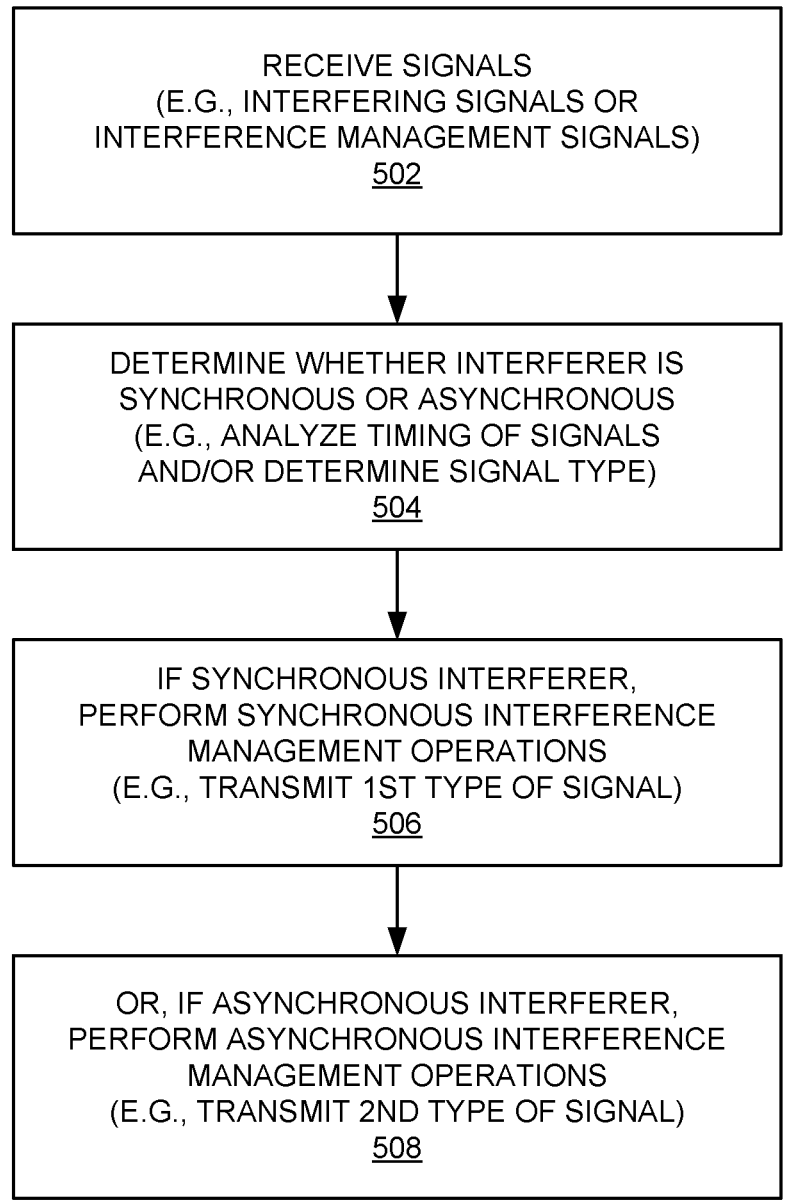
FIG. 5 is a flowchart of several sample aspects of operations that may be performed in response to synchronous and/or asynchronous interference.
Figure 9A:
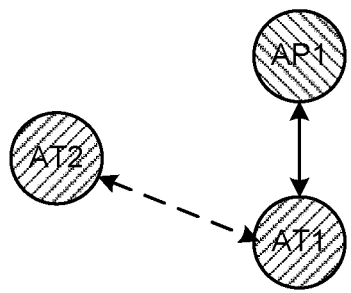
FIGS. 9A-9E are a simplified diagrams illustrating several sample aspects of interference overlap.
Figure 9B:
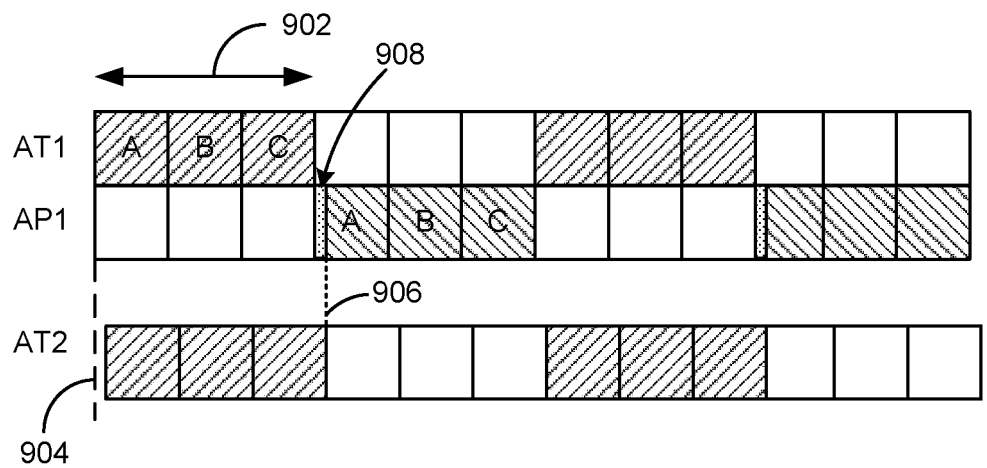
Figure 9C:
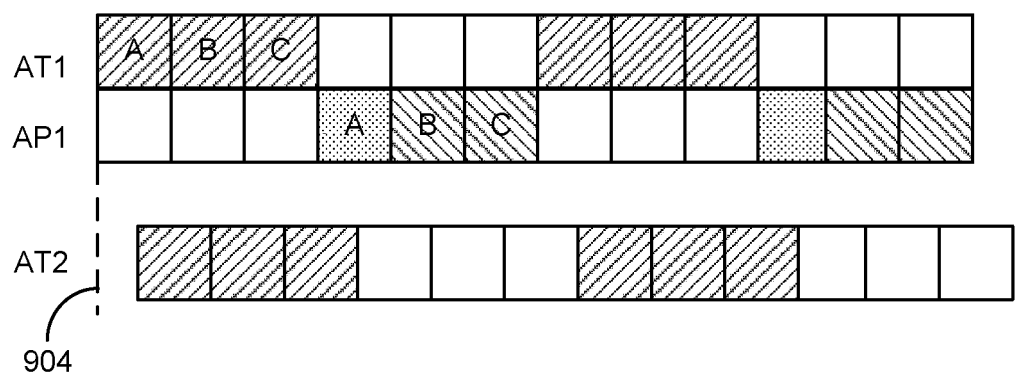
Figure 9D:
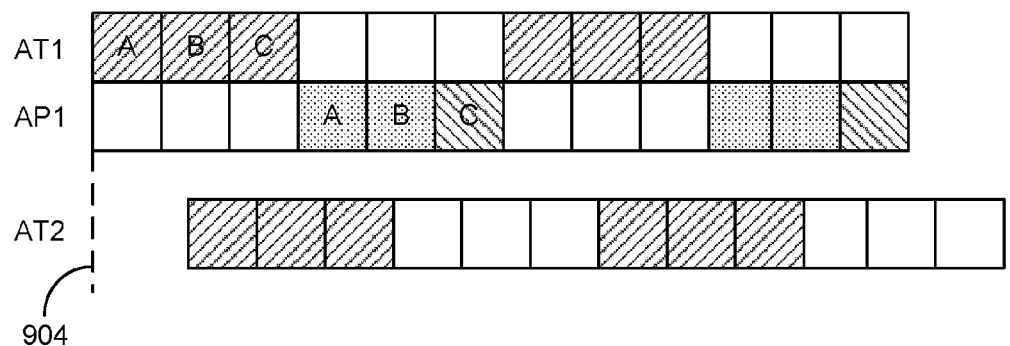
Figure 9E:
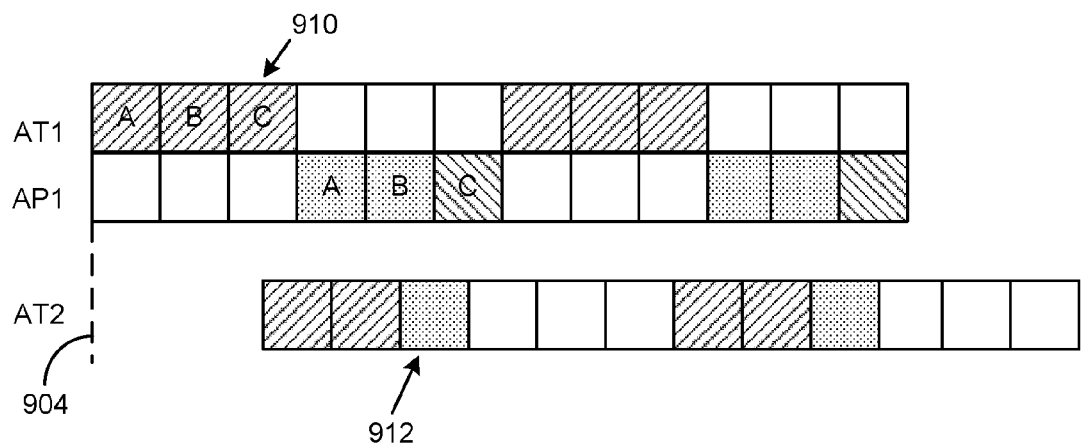
Figure 10:
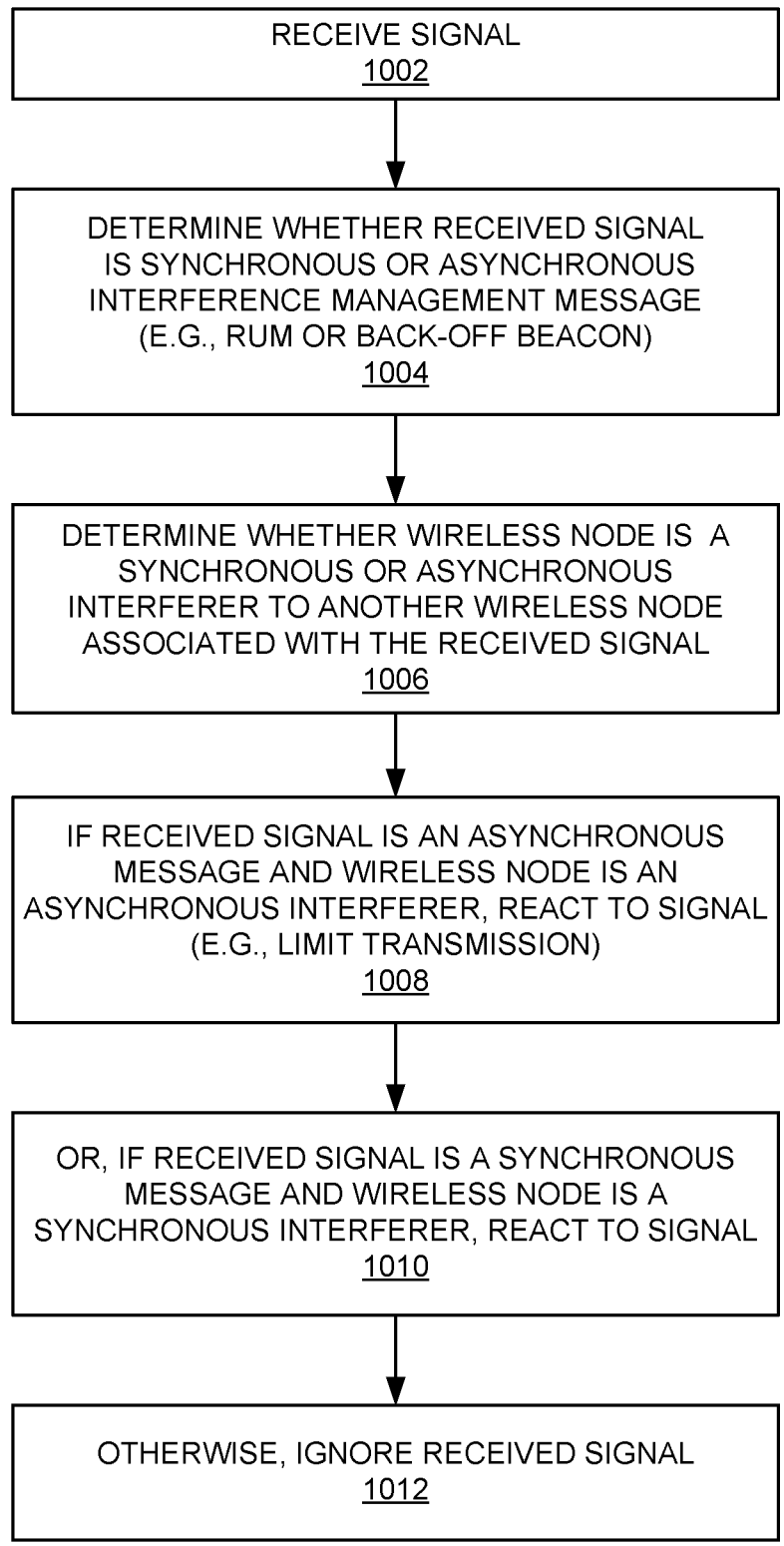
FIG. 10 is a flowchart of several sample aspects of operations that an interfering node may perform in response to a received interference management signal.
Figure 11:
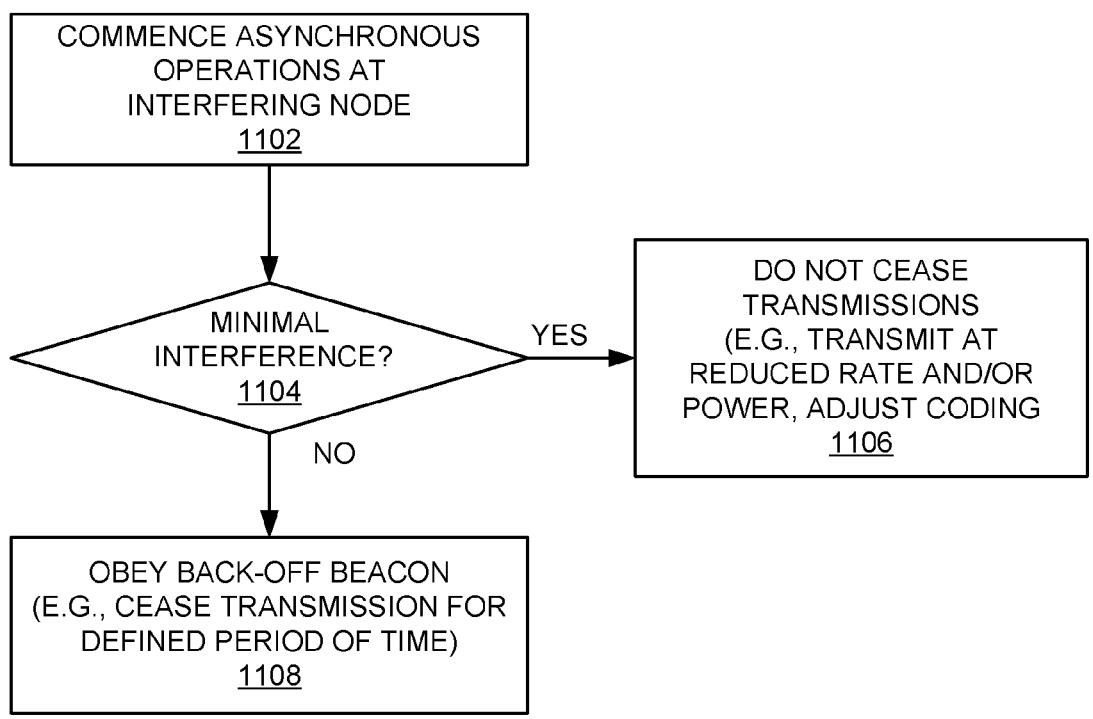
FIG. 11 is a flowchart of several sample aspects of asynchronous interference management operations that may be performed by an interfering node.

FIGS. 4-11 describe additional details that may be employed in conjunction with interference management. Briefly, FIG. 4 relates to operations a node may perform to broadcast an indication relating to that node's share of resources (e.g., an activity factor) to its neighbors. FIG. 5 relates to operations a receiving node may perform to handle synchronous and asynchronous interferers. FIGS. 6-9 relate to sample asynchronous interference management operations of a receiving node. FIGS. 10-11 relate to sample operations of an interfering node.

For convenience, the operations of FIGS. 2, 4-8, and 10-11 (or any other operations discussed or taught herein) may be described as being performed by specific components (e.g., components of the system 300 of FIG. 3). It should be appreciated, however, that these operations may be performed by other types of components and may be performed using a different number of components. It also should be appreciated that one or more of the operations described herein may not be employed in a given implementation.

Referring initially to the operations of FIG. 2, as represented by block 202 the nodes in a system may repeatedly (e.g., periodically) transmit interference management-related signals. As discussed in more detail below, a node that receives such signals (e.g., hereafter the node 302) thereby may acquire information about the node that transmitted the signals and use that information for interference management operations.

FIG. 4 describes several sample operations that may be performed in conjunction with generating and broadcasting interference management-related signals relating to a share of resources associated with a given node. In the discussion that follows, a parameter relating to such a share of resources may be referred to as an activity factor. In some aspects an activity factor for a given node may represent an expectation of that node to a given share of wireless resources. For example, given a set of resources, the share of those resources to be allocated to a given node is expected to be proportional to that node's activity factor relative to the share of resources allocated for other nodes in the system.

As represented by block 402, each node in the system may identify one or more traffic flows (e.g., the node's currently active receive flows and/or transmit flows). For example, an access terminal may identify all of the forward link flows it receives from an associated access point. An access point, on the other hand, may identify all of the active reverse link flows it receives from its connected access terminals. In the example of FIG. 3, the identification of traffic flow(s) for the receiving nodes 302 may be performed by a flow identifier 310 or some other suitable component. For example, the flow identifier 310 may maintain a list of all active traffic flows of the node 302.

As represented by block 404, each node in the system may determine a share of resources (e.g., an activity factor) based on the identified traffic flow or flows. For example, each access terminal in a system may determine its activity factor based on that access terminal's respective traffic flow(s). Similarly, each access point in the system may determine its activity factor based on traffic flows of its associated access terminals.

In the example of FIG. 3, the operation of determining the share of resources may be performed by a resource processor 312 or some other suitable component. For example, in some cases a share of resources comprises a parameter that is assigned to a particular type of traffic flow. In this case, the resource processor 312 may simply maintain the designated share value for a currently active traffic flow. In addition, in the event the node 302 has multiple traffic flows, the resource processor 312 may generate a composite share of resources value for the node 302 based on the share values associated with each of the traffic flows.

In some aspects the share of resources relates to quality of service (e.g., throughput and/or latency) associated with the flow(s). For example, a given traffic flow to be received by a given node may be assigned a particular level of quality of service. The shares of resources assigned to different traffic flows may therefore correspond to relative quantity of resources that it is desired to allocate for the traffic flows, wherein this desired allocation is based on the relative quality of service requirements of the flows. As a specific example, a flow with a quality of service requirement that is twice the quality of service requirement of another flow may be assigned a share of resources that is twice the share of resources assigned to the other flow.

In some aspects, the assigned quality of service, and hence, the share of resources, may be based on traffic classifications. For example, one traffic class (e.g., real time traffic such as voice traffic) may be assigned a given quality of service level while another traffic class (e.g., best effort traffic such as e-mail and web browsing) may be assigned a different quality of service level. Consequently, the activity factor for real time traffic class may be defined to be a certain value while the activity factor for best effort traffic class may be defined to be a different (e.g., lower) value.

It should be appreciated that traffic classes may take various forms. For example, in some cases traffic classes may be based on general characteristics of the traffic (e.g., real time, best effort, and so on). In some cases traffic classes may be based on underlying applications (e.g., e-mail, video, voice, web-browsing, file transfer, and so on). In some cases traffic classes may be based on data rates or latency requirements (e.g., a high speed traffic flow, a low speed traffic flow, a low latency requirement, and so on).

In some cases an activity factor also may be based on radio frequency ("RF") conditions. For example, in the event RF conditions at a given node are poor, a node may be assigned a higher activity factor.

As represented by block 406, each node in the system repeatedly transmits an indication of its share of resources (e.g., an activity factor relating to current or expected traffic activity at that node) when it is active. Thus, an access point may continually transmit this indication as long as it is powered on. In contrast, in some cases an access point may transmit the indication only if it is connected and transmitting data. Here, it should be appreciated that the activity factor value of a given node may change over time as the number of traffic flows and type of each flow changes over time.

A node may transmit (e.g., broadcast) an activity factor in a variety of ways. For example, in some cases a node may transmit the activity factor along with another signal (e.g., a composite message) while in other cases a node may transmit the activity factor as a dedicated signal. As an example of the former case, a node may transmit the activity factor along with acquisition pilot signals that the node periodically broadcasts (e.g., every 100 milliseconds). A node also may transmit activity factors for different traffic classes. For example, a node may transmit activity factors for best effort traffic, for expedited forwarding traffic, for assured forwarding traffic, and so on. The node may transmit these different activity factors in separate messages or in common messages.

For the node 302 of FIG. 3, an activity signal generator 314 or some other suitable component may provide the activity factor (e.g., a message including the activity factor) that is then transmitted by a transmitter 316. The node 304 may include similar components (e.g., an activity signal generator 318 and a transmitter 320) that generate and transmit its activity factor. To reduce the complexity of FIG. 3, other components of the node 304 that may be used in conjunction with these operations are not shown.

Referring again to FIG. 2, as represented by block 204, the nodes in the system will receive the interference management messages broadcast by its neighboring nodes over time. For example, a receiver 322 of the node 302 may receive a message transmitted by the transmitter 320. Consequently, each node in the system may acquire the current activity factors of its neighbor nodes.

As represented by block 206, at some point in time a node (e.g., the node 302) may receive signals associated with potential interference at the node. In some cases the node 302 may receive signals from one or more other nodes that currently interfere with reception at the node 302. In some cases the node 302 may determine that given the timing of signals that are currently being received, it is anticipated that future reception at the node 302 will be subjected to interference. For example, a nearby node may be transmitting during a portion of a timeslot that is or will be used by the node 302 to receive data. In some cases the node 302 may receive broadcast signals (e.g., acquisition signals, beacons, and so on) from nearby nodes whereby the node 302 may determine the timing and transmit power of the nearby nodes. From this information, the node 302 may determine whether transmissions by the nearby node will interfere with reception at the node 302. In the example of FIG. 3, interference identification operations such as these may be performed by an interference identifier 324 (which also may be referred to herein as interference determiner 324).

In some scenarios, a node may receive the interference-related signals via another node. For example, an access point may receive a message from an associated access terminal whereby the message includes interference-related information. Such a scenario may occur, for example, when the access terminal is close enough to another node to receive inference-related signaling from the node, but the access point is not close enough to the node to directly receive that signaling. A node also may receive interference-related signals from another node (e.g., an access point or an access terminal) via the backhaul of a network. For example, a first access point may transmit interference information to a second access point over the backhaul. The second access point may then use this information and/or forward the information to its access terminals.

As represented by block 208, the node 302 (e.g., an interference controller 326) determines how to react to potential or actual interference. As will be discussed in more detail below, the node 302 may elect to ignore the interference, avoid the interference by backing-off in frequency (e.g., switch to another carrier) or in time (e.g., avoid receiving during certain subslots), or by reserving a carrier for a period of time (e.g., by transmitting interference management signals).

The decision regarding how to react to the interference may depend on various factors. In some aspects this decision may be based on the duration of time the interference overlaps a receive timeslot of the node 302. For example, if there is only minor overlap in interference, the interference controller 326 may essentially ignore the interference. If there is a larger amount of interference overlap, the interference controller 326 may elect to refrain from using one or more subslots of a receive timeslot. If the overlap is substantial, the interference controller 326 may elect to transmit interference management signals such as back-off beacons in an attempt to reserve a carrier for a period of time. Operations such as these will be discussed in more detail in conjunction with FIGS. 7 and 9A-9E below.

The conditions under which a given node elects to commence asynchronous operations may depend on the node type. For example, an access point may trigger asynchronous operation when it receives relatively strong interference from an access terminal in cases where the access point cannot "see" the access point of that access terminal. An access terminal, on the other hand, may trigger asynchronous operation simply when it receives relatively strong interference from another access terminal. In addition, an access terminal may trigger asynchronous operation when it receives relatively strong interference from an access point that cannot be "seen" by the access point that serves that access terminal.

As represented by block 210, the transmission of back-off beacons by a node in the system may be metered (e.g., restricted) in an attempt to ensure that the resources of the system are allocated in a fair manner. As discussed below, in some aspects this metering may be based on the activity factors of the node 302 and its neighboring nodes. For example, the rate at which the node 302 transmits back-off beacons may be based on an activity share that is defined as a ratio of the activity factor of the node 302 and the sum of the activity factor of the node 302 and the activity factors collected by the node 302 (e.g., the activity factor transmitted by the node 304). Operations relating to determining an activity share will be discussed in more detail in conjunction with FIG. 8 below.

As represented by block 212, whenever a node receives a back-off beacon, that node may determine how to react to the back-off beacon. For example, when a receiver 328 of the node 304 receives a back-off beacon, an interference determiner 330 may determine whether transmissions by the node 304 may interfere with reception at the node 302. Based on this determination, an interference controller 332 may determine whether to ignore the back-off beacon or take some action to reduce potential interference (e.g., limit transmissions immediately upon receipt of the back-off beacon). Operations such as these will be discussed in more detail in conjunction with FIGS. 10 and 11 below.

Advantageously, the interference management operations taught herein may be employed using relatively efficient signaling. For example, all signaling between nodes may comprise broadcast PHY level signaling. Thus, no message exchanges are required between a node (e.g., an access point or an access terminal) and an interferer. In addition, no connection is required between a node and its interferer.

Referring now to FIG. 5, in some cases a node may be configured to perform synchronous and/or asynchronous interference management operations depending on the type of interference-related signals received by the node. As mentioned above, a node may identify current or potential interference based on actual interfering signals that it receives and/or based on interference management-related signals that it receives.

As an example of the latter type of signals, the nodes in a system may repeatedly transmit pilot signals (e.g., acquisition pilots) or other similar signals when they are active (e.g., powered on). Here, each of the pilot signals may be transmitted at a known power level or power spectral density. A node that receives such signals may thereby discover the existence and timing of its neighbor nodes for use in interference management operations.

For example, a potential interferer may determine whether its transmissions may interfere with reception at a node based on the pilot signals received from that node. Here, the potential interferer may estimate the path loss between the nodes based on the power of the received pilot signal and the known transmit power for the pilot signal. As will be discussed in more detail below, in the event a node transmits an interference management message requesting that potential interferers limit their transmission for a period of time, a potential interferer that receives the message may use the estimate of path loss to determine whether it may cause interference with the message-sending node. Based on this determination, the potential interferer may determine how to react to the interference management message (e.g., limit transmissions).

In a similar manner, a first node that receives a pilot signal from a second node may determine whether transmissions by the second node may interfere with reception at the first node. Here, the receiving node (i.e., the first node) may make such a determination based on the signal strength of the received signal and information regarding the transmission power of the interfering node (i.e., the second node). In the event the receiving node determines that it is being or may be interfered with, the receiving node may perform appropriate interference mitigation operations (e.g., back-off in frequency or time, or transmit an interference management message).

Referring now to the operations of FIG. 5, as represented by block 502, at some point in time a node (e.g., hereafter the node 302) may receive signals indicative of interference at that node. As discussed above, these signals may be actual interfering signals from an interfering node (e.g., hereafter the node 304) or other signals generated by the interfering node.

As represented by block 504, the receiving node 302 (e.g., the interference determiner 324) may determine whether the interfering node 304 is a synchronous interferer or an asynchronous interferer. In some cases, this may involve analyzing timing of the received signals to determine whether this timing coincides with the expected timing of signals that are synchronized to timing (e.g., timeslot timing) of the node 302. In some cases, this may involve analyzing the type of signals received to determine that the signal type corresponds to a synchronous or an asynchronous interferer. For example, the interference determiner may determine whether the signals are associated with (e.g., comprise) a synchronous interference message or an asynchronous interference message.

As represented by block 506, in the event the interference is synchronous, the receiving node 302 (e.g., the interference controller 326) may perform synchronous interference management operations. For example, a synchronous signal generator 334 may generate a synchronous interference management signal that the node 302 then transmits in an attempt to mitigate the synchronous interference. In some cases this type of signaling may comprise time division multiplexed signaling.

In some implementations such a synchronous message may comprise a resource utilization message ("RUM") as described in U.S. Patent Application Publication No. 2007/0105574, the disclosure of which is hereby incorporated by reference. In this case, fair-sharing of a wireless channel may be facilitated by joint scheduling of a transmission by synchronized transmitting and receiving nodes through the use of a RUM. Here, a transmitting node may request a set of resources based on knowledge of resource availability in its neighborhood and a receiving node may grant the request based on knowledge of resource availability in its neighborhood. For example, the transmitting node may determine channel availability by listening to receiving nodes in its vicinity and the receiving node may determine potential interference by listening to transmitting nodes in its vicinity.

In the event the receiving node is subjected to interference from neighboring transmitting nodes, the receiving node may transmit a RUM (e.g., at one or more specified control channel locations within a timeslot) in an attempt to cause the neighboring transmitting nodes to limit their interfering transmissions. According to related aspects, a RUM may be weighted to indicate not only that a receiving node is disadvantaged (e.g., due to the interference it sees while receiving) and desires a collision avoidance mode of transmission, but also the degree to which the receiving node is disadvantaged.

A transmitting node that receives a RUM (e.g., by monitoring a control channel at specified times) may utilize the fact that it has received a RUM, as well as the weight thereof, to determine an appropriate response. For example, the transmitting node may elect to abstain from transmitting, may reduce its transmit power during one or more designated timeslots, or may ignore the RUM. The advertisement of the RUMs and associated weights may thus provide a collision avoidance scheme that is fair to all nodes in the system.

As represented by block 508, in the event the interference is asynchronous, the receiving node 302 (e.g., the interference controller 326) may perform asynchronous interference management operations. For example, an asynchronous signal generator 336 may generate an asynchronous interference management signal that the node 302 transmits in an attempt to mitigate the asynchronous interference. In some cases this type of signaling may comprise time division multiplexed signaling or frequency division multiplexed signaling. Various aspects of asynchronous interference management operation are described below in conjunction with FIGS. 6-9.

Figure 6:
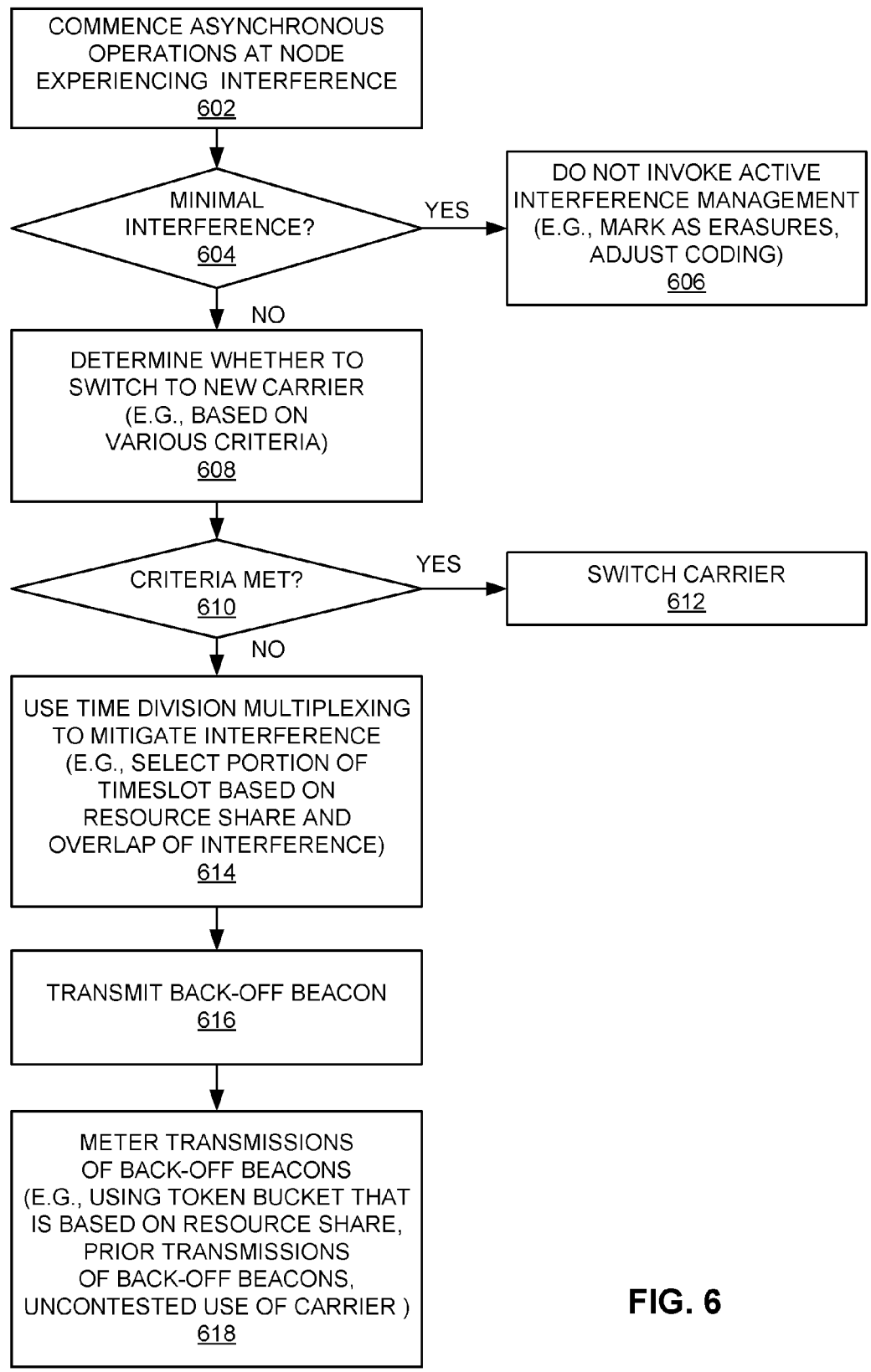
FIG. 6 is a flowchart of several sample aspects of operations that may be performed to manage asynchronous interference.

Referring to FIG. 6, the asynchronous interference management operations commence at block 602 (e.g., in response to receipt of asynchronous interference signals as discussed above). As represented by block 604, in the event the interference is relatively minimal the node 302 (e.g., the interference controller 326) may elect to not invoke active asynchronous interference management (block 606). For example, if the interference only affects a very small portion of a timeslot, the node 302 (e.g., the receiver 322) may simply mark any signals received during that portion of the timeslot as an erasure. Alternatively or in addition, the node 302 may adjust coding and/or modulation associated with processing of the received signals (e.g., adjust rate prediction), or adjust other communication parameters (e.g., data rate or redundancy) to facilitate effective reception of data despite the interference.

In the event the interference is not relatively minimal at block 604, the node 302 may perform one or more of the asynchronous interference management operations represented by blocks 608-618. At block 608 the interference controller 326 (e.g., a carrier selector 338) may determine whether to back off in frequency to avoid the interference. This may involve, for example, determining whether to switch communication operations to one or more other carriers where there is less interference (e.g., no interference).

A determination to switch to another carrier may be based on various criteria. Several examples follow.

In some aspects the node 302 may select a carrier based on the level of interference on each of the carriers. For example, the node 302 may select the carrier that has the lowest received power associated with asynchronous interference.

In some aspects the node 302 may select a carrier based on a quantity of interferers transmitting on each of the available carriers. For example, the node 302 may select the carrier that has the lowest number of asynchronous interferers.

In some aspects the node 302 may select a carrier based on the node's prior use of one or more carriers. For example, the node 302 may select a carrier based on the node's historical success or failure on different carriers. That is, the node 302 may select the carrier upon which it has had the most successful communications (e.g., higher connection success rate, higher quality of service, and so on).

In some aspects the node 302 may select a carrier based on a preferred use for one or more carriers. For example, in some cases a given node may prefer to operate on a certain carrier or certain carriers. In some cases, an interfering node (e.g., the node 304) may prefer to be backed-off (or not backed-off) of a certain carrier or certain carriers. In either of these cases, a node (e.g., an access point) having a preferred or non-preferred carrier may advertise that information to other nodes via appropriate signaling.

In some aspects the node 302 may select a carrier based on whether one or more carriers would be needed for the node's communication. For example, a node (e.g., an access point)

may favor scheduling on a single carrier as opposed to multiple carriers (e.g., when the traffic load of the node is relatively light). Other nodes may do the same thing in an attempt to have each node select a carrier that is not being used by any other nodes (carrier availability permitting). Carrier selection also may be based on traffic class. For example, a node may elect to route all low-rate traffic over the same carrier.

Referring to block 610 of FIG. 6, in the event the currently designated criterion is met or the designated criteria are met, the node 302 may switch to another carrier or carriers at block 612. In the event a decision is made to not switch carriers, the node 302 may elect to use time division multiplexing (block 614) and/or back-off beacons (block 616) to manage the asynchronous interference. It should be appreciated that in some cases a node may use a combination of one or more of carrier selection, time division multiplexing, and back-off beacons to manage the asynchronous interference.

In some aspects the operations of block 614 may involve electing to operate on a portion of a timeslot based on the degree to which the asynchronous interference overlaps the timeslot. An example of such operations will be described in conjunction with FIGS. 7 and 9A-E.

For illustration purposes these operations will be described in the context of a communication system as shown in FIG. 9A where an access terminal AT1 is communicating with an access point AP1. Here, transmissions by another node (e.g., an access terminal AT2) asynchronously interfere with AT1's reception of data from AP1. Thus, in this scenario AT1 may comprise the receiving node 302 and AT2 may comprise the interfering node 304. It should be appreciated that this is but one example of how a node may interfere with another node. For example, in other cases transmissions by another access point (not shown) may asynchronously interfere with AT1's reception of data from AP1. In addition, in some cases the described interference management operations may be performed by an access point that is experiencing interference.

In some aspects the operations described herein may be employed in the event AP1 does not hear the access point associated with AT2. In such a case, AP1 may not be able to synchronize with AT2's access point. As a result, AT1 may need to perform asynchronous interference management operations to deal with the asynchronous interference from AT2. The operations described herein also may be employed in a case where AP1 does not hear the access point associated with AT2, but is able to use AT1 to synchronize with AT2's access point. In this case, the asynchronous operations described here may be employed while the synchronization is taking place.

The hatched lines in FIGS. 9B-E relate to the transmissions of the respective nodes. For example, in FIG. 9B transmissions by AT1 are represented by the shading in the top row. Here, the length of a timeslot is represented by an arrowed line 902 and subslots are represented by the subportions of each timeslot (e.g., subslots A, B, and C). Transmissions by AP1 are represented by the shading in the middle row. Here, it should be noted that the timeslot timing of AT1 and AP1 are synchronized. Transmissions by AT2 are represented by the shading in the bottom row. The timeslot timing of AT2 is not synchronized with the timeslot timing of AT1 and AP1 as indicated by the gap in the bottom row following the dashed line 904. The representations of FIGS. 9C-E are similar to FIG. 9B, with the differences noted below.

The timeslots shown in FIGS. 9B-E also may include control information. For example, one or more portions of a given timeslot may be defined to carry a control channel. In one specific example, two control channels may be defined within a timeslot where a first control channel is defined between subslots A and B and a second control channel is defined between subslots B and C (e.g., as represented by the vertical lines separating the subslots). Here, it should be appreciated that the control channels in AT1's receive timeslot correspond in time to the control channels in AP1's transmit timeslot and vice versa.

Figure 7:
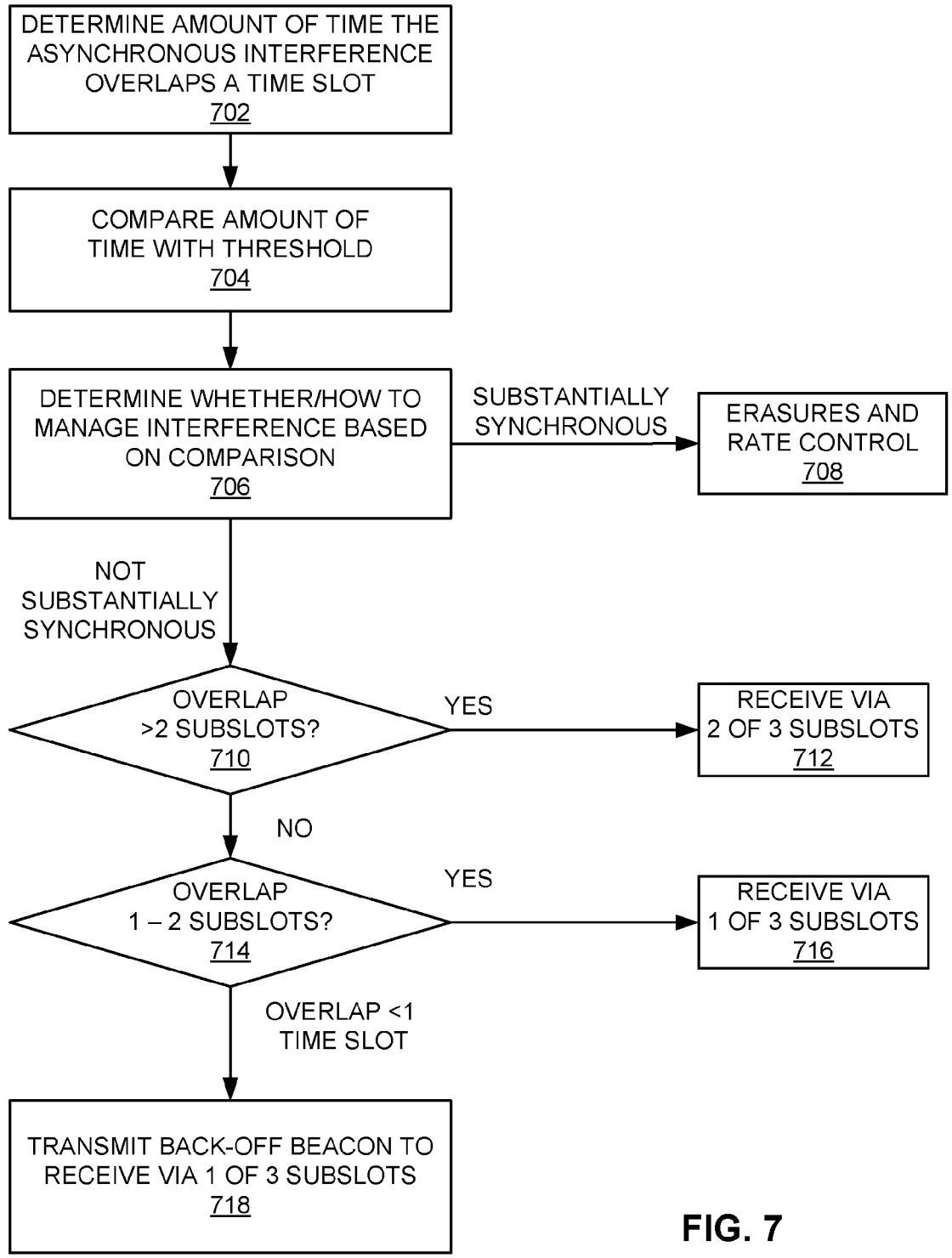
FIG. 7 is a flowchart of several sample aspects of operations that may be performed to determine interference overlap and manage the interference.

Referring now to the operations of FIG. 7, as represented by 702 a receiving node (e.g., AT1) determines the amount of time the asynchronous interference overlaps a timeslot. As an example, AT1 (e.g., node 302) may include a timer component 340 that determines the duration of time that AT1 and AT2 (e.g., node 304) concurrently transmit.

FIGS. 9B-E depict various examples of such overlap. In FIG. 9B the transmissions of AT1 and AT2 substantially overlap, but do not completely overlap. Hence, the transmissions of AT2 slightly overlaps with the reception of AT1 as indicated by the small area between a dashed line 906 and the end of AT1's transmit timeslot (where the duration of the timeslot corresponds to the line 902). FIG. 9C represents an example of a scenario where the transmissions of AT1 and AT2 overlap by more than two subslots but by less than the example of FIG. 9B. FIG. 9D represents an example of a scenario where the transmissions of AT1 and AT2 overlap by between one and two subslots. FIG. 9E represents an example of a scenario where the transmissions of AT1 and AT2 overlap by less than one subslot.

As represented by block 704 of FIG. 7, AT1 may compare the amount of overlap with a threshold. For example, AT1 may comprise a comparator 342 that compares timing information from the timer 340 with one or more stored thresholds. In some cases, these thresholds may correlate to the scenarios of FIGS. 9B-E. Here, it should be appreciated that an overlap in interference may be determined based on the degree to which AT2's transmit timeslot overlaps with AT1's receive timeslot (or vice versa) or the degree to which the transmit (or receive) timeslots of AT1 and AT2 overlap. As an example of the transmit timeslot overlap case, the comparison operation of block 704 may involve determining whether there is substantial transmission timeslot overlap (FIG. 9B), transmit timeslot overlap of more than two subslots (FIG. 9C), transmit timeslot overlap between one and two subslots (FIG. 9D), or transmit timeslot overlap by less than one subslot (FIG. 9E).

As represented by block 706, AT1 may determine whether or how to manage the asynchronous interference based on the results of the comparison of block 704.

As mentioned above in conjunction with blocks 604 and 606, if the interference is minimal (e.g., the transmissions of AT1 and AT2 are substantially synchronous), AT1 may elect to not perform active interference management. Thus, as represented by block 708, the interference may, in effect, be handled by erasures, rate control, or in some other manner (e.g., as discussed above). In this case, a small portion of the information (e.g., data) transmitted by AP1 may not be effectively received by AT1. In the example of FIG. 9B, this portion is represented by a shaded area 908 in AP1's transmit timeslot. Here, it should be appreciated that AT1 may still receive all of the data for subslots B and C and both control channels without interference from AT2.

If the interference is not minimal at block 706 (e.g., the transmissions of AT1 and AT2 are not substantially synchronous), AT1 may perform interference management operations such as time division multiplexing and/or transmitting back-off beacons. Examples of time division multiplexing will be treated in conjunction with blocks 710-716 and FIGS. 9C-9E. Here, AT1 elects to receive via one portion (e.g., one or more subslots) of a timeslot when there is interference on another portion of the timeslot. In the example of FIG. 3, these operations may be performed by a subslot selector 344 of the interference controller 326. An example of transmitting back-off beacons will be treated in conjunction with block 718.

At block 710, AT1 determines whether the transmit timeslot overlap is greater than two subslots (but less than the overlap at block 708). As shown in the example of FIG. 9C, AT2's transmit timeslot fully overlaps AT1's subslots B and C. In addition, a portion of AT2's transmit timeslot overlaps one of AT1's receive subslots such that AT2's transmissions at the end of its timeslot may interfere with AT1's reception during the first subslot of its receive timeslot. In this case, as represented by block 712, AT1 may elect to not receive via the subslot that is subject to interference. This scenario is represented in FIG. 9C by the shading of subslot A for AP1's transmit timeslot. In this case, AT1 may still receive all of the data for subslots B and C and both control channels without interference from AT2.

At block 714, AT1 determines whether the transmit timeslot overlap is between one and two subslots. As shown in FIG. 9D, AT2's transmit timeslot partially overlaps AT1's subslot B and fully overlaps AT1's subslot C. Consequently, AT2's transmissions during its last two subslots interferes with reception during the first two subslots of AT1's receive timeslot. In this case, as represented by block 716, AT1 may elect to not receive via the two subslots and the first control channel that are subject to interference. This scenario is represented in FIG. 9D by the shading of subslots A and B for AP1's transmit timeslot. In this case, AT1 may still receive all of the data for subslot C and the second control channel without interference from AT2.

FIG. 9E illustrates an example where the transmit timeslot overlap is less than one subslot (e.g., AT2's transmit timeslot only overlaps a portion of AT1's subslot C). Here, AT2's transmissions interfere with reception during each subslots of AT1's receive timeslot and during both control channels. In this case, as represented by block 718, AT1 may transmit a back-off beacon to reserve a resource (e.g., one or more carriers) for a period of time.

In the example of FIG. 9E, AT1 may transmit a back-off beacon during its transmit subslot C (as indicated by arrow 910) so that it may receive, without interference, data in subslot C and information from the second control channel. After receiving this back-off beacon, AT2 may abstain from transmitting during its third transmit subslot (as indicated by arrow 912). As a result, AT1 may then receive all of the data for subslot C and the second control channel without interference from AT2. As indicated by the shading of subslots A and B for AP1's transmit timeslot in FIG. 9E, AT1 may not receive during those subslots.

The use of back-off beacons will be treated more generally with reference to block 616 of FIG. 6. It should be appreciated that the operations described above for block 718 relates to but one scenario of how back-off beacons may be employed for asynchronous interference management and that various other scenarios are possible. For example, in other cases a node may first determine the amount of overlap in interference and then, based on that overlap, determine whether to change carriers.

As another example, a node may transmit a back-off beacon to reserve a resource under a scenario where the subslot time division multiplexing described above is not used. For example, in the event a node is experiencing any type of asynchronous interference, the node may simply issue a back-off beacon to reserve resources (e.g., one or more carriers) for a defined period of time.

A period of time associated with a back-off beacon may be defined in various ways. For example, the time period may be one timeslot, multiple timeslots, or a specific duration such as 10 or 20 milliseconds, and so on.

In addition, various techniques may used to provide an interfering node with the time duration information to be used for a given back-off beacon. For example, in some cases the defined period of time may be predefined and this information may be programmed into all of the nodes in the system. In some cases the back-off beacon may include information indicative of the defined period of time. In some cases some other message including information indicative of the defined period of time may be sent to the nodes of the system.

Various techniques may be employed to reserve resources using back-off beacons. For example, in some cases a node may simply attempt to reserve the carrier or carriers it is currently operating on. In some cases a node may select one or more carriers to reserve based on, for example, the criteria discussed above in conjunction with block 608. In some cases a node may randomly select any one or more of the carriers that are currently available.

In some aspects, a system may employ a first-come, first-serve back-off beacon scheme in an attempt to ensure fairness for all nodes. Here, before transmitting a back-off beacon a node may monitor the carrier to make sure no other back-off beacons are currently active. For example, all nodes monitoring a given carrier may honor the first back-off beacon that is transmitted on that carrier. After the back-off period for the first back-off beacon expires, another node may transmit its back-off beacon on that carrier, whereby the other nodes then honor that back-off beacon.

As a simplified example, it is assumed that three asynchronous nodes each hear one another, but do not hear any other asynchronous nodes. Moreover, each of these nodes advertises the same activity factor value. In this case, the nodes may alternate sending out back-off beacons in a round-robin manner. Thus, a first node may send a back-off beacon and use the carrier. After the first back-off beacon expires, a second node may send a back-off beacon and use the carrier. After the second back-off beacon expires, a third node may send a back-off beacon and use the carrier, and so on.

As represented by block 618 of FIG. 6, each of the nodes in a system may meter (e.g., restrict) its respective transmission of back-off beacons in an attempt to ensure that the resources of the system are reserved in a fair manner. For example, a node may employ a token bucket or some other suitable scheme to regulate when (e.g., how often) the node may reserve a carrier and how many carriers the node may reserve. In some implementations metering operations such as these may be provided by a metering component 346 of the asynchronous signal generator 336.

In some aspects, the metering of back-off beacons may be based on quality of service associated with the nodes in a system. For example, a token bucket for a given node may be filled at a rate that is based on a resource share (discussed below) associated with that node. This rate, in turn, serves to control how often the node transmits a back-off beacon. As an example, if the resource share is 1/5, the node may transmit a back-off beacon once every five opportunities. The token bucket may then be drained (e.g., incrementally) each time the node transmits a back-off beacon or each time the node uses an uncontested carrier (e.g., a carrier that was not presently being used by any other node). Here, it should be appreciated that the number of tokens in the token bucket may increase if a node is not currently getting enough opportunities to send back-off beacons over a carrier or carriers.

In some cases the size of the token bucket may be defined to control the rate at which back-off beacons are transmitted by a node. For example, if the bucket size is five and there are ten carriers, the node is restricted to sending only five back-off beacons at a time.

In some aspects, a resource share of a given node provides an indication of how much of a resource should be allocated for that node in view of the relative quality of service requirements of all of the nodes in that vicinity that are using that same resource. For example, each node in the system may calculate an activity share based on its own activity factor, the activity factors it receives from neighboring nodes, and the number of carrier used by the node (e.g., the number of available carriers). Equation 1 sets for an example of a formula for calculating activity share.

$$ActivityShare_i = NumberOfCarriers \times \frac{ActivityFactor_i}{ActivityFactor_i + \sum_{n \neq i} ActivityFactor_n} \quad (1)$$

Figure 8:
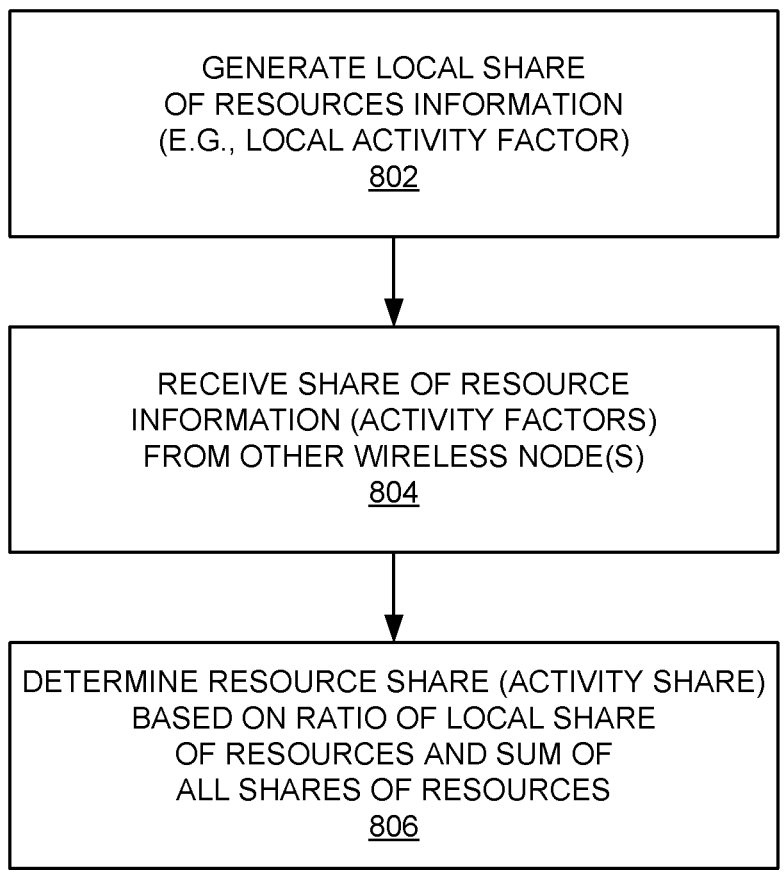
FIG. 8 is a flowchart of several sample aspects of operations that may be performed to determine a resource share.

FIG. 8 illustrates sample operations that a node may employ to define its resource share (e.g., activity share). As represented by block 802, at some point in time the node generates an indication of its share of resources (e.g., the node's activity factor). Block 802 may thus represent the operations described above in conjunction with FIG. 4.

As represented by block 804, at various points in time the node may receive share of resource information (e.g., activity factors) from one or more other nodes. Again, these operations may be similar to the activity factor collection operations described above.

As mentioned above, the activity factor of an access point may comprise the sum of the activity factors of all active access terminals associated with the access point. Consequently, a node that is interfered with by an access point and one or more of the access terminals associated with that access point will only count the activity factor from the access point. In this way, the activity factors of the access terminals are not counted twice in the equation.

As represented by block 806, the node calculates its resource share (e.g., based on the information acquired at blocks 802 and 804). This operation may employ Equation 1 as discussed above or other suitable procedures. For example, in some cases a resource share may be based on the number of asynchronously received interference management signals (e.g., as opposed to activity factor values provided by received signals). In some implementations the operations of block 806 may be performed, for example, by the resource processor 312.

It should be appreciated that in various implementations the operations described above may be employed independently or in some combination. For example, if switching to a new carrier provides sufficient interference management, a receiving node may elect to only perform this operation for a given interference condition. Alternatively, a receiving node may not attempt to switch carriers but may instead utilize one or both of time division multiplexing and back-off beacons to provide interference management. In still other cases, a receiving node may switch carriers and also utilize one or both of time division multiplexing and back-off beacons to achieve the most effective interference management. Furthermore, in some cases, the time division multiplexing of a node on a given carrier may depend on the activity share of the node. For example, if a node has an activity share of 2/3 and it is experiencing interference on two of its three subslots, the node may use back-off beacons to clear off a second one of the subslots. Also, is should be appreciated that each node of a set of communicating nodes may concurrently employ the interference management techniques taught herein (e.g., on an uplink and downlink pair).

Referring now FIGS. 10 and 11, various interference management operations that may be performed by an interfering node (e.g., node 304) will now be treated. As represented by block 1002, at some point in time the interfering node receives a signal from another node. At block 1004, the interfering node (e.g., the interference determiner 330) determines whether the received signal is a synchronous interference management message (e.g., a RUM) or an asynchronous interference management message (e.g., a back-off beacon).

As represented by block 1006, the interfering node (e.g., the interference determiner 330) determines whether it is a synchronous or asynchronous interferer to a node associated with the received signal (e.g., a receiving node 302 that transmitted the signal). To this end, the interfering node may determine, for example, whether its transmissions are strong enough to interfere with the reception at the receiving node. As discussed above, this procedure may involve determining the receive power of beacons or other similar signals received from the receiving node. In the event it is determined that the transmissions of the interfering node will not cause interference (e.g., based on a defined threshold) at the receiving node, the operational flow may proceed to block 1012 whereby the interfering node may simply ignore the received signal.

If it is determined that there may be interference, the interfering node may determine the timing of the receiving node based on one or more signals received from the receiving node. For example, such timing information may be derived from the timing of received beacons or interference management messages or from information provided by those or other messages. Thus, in some cases the timing of a received signal may be compared with the expected timing of signals associated with synchronous operation at the interfering node to determine whether the interfering and receiving nodes are synchronized. Based on this timing information or other suitable information, the interfering node may then determine whether its interfering transmissions are synchronous or asynchronous to the receiving node.

As represented by block 1008, the interfering node (e.g., the interference controller 332) may elect to react to the received signal if the received signal is an asynchronous interference management message and the interfering node is an asynchronous interferer to the receiving node. For example, in response to a received back-off beacon, the interfering node may limit a future transmission in some manner. An example of such asynchronous interference management operations will be described in conjunction with FIG. 11, commencing at block 1102.

As represented by block 1104, in the event the interference is relatively minimal (e.g., below a defined threshold), the interfering node may elect to not cease transmissions during the time period designated for a received back-off beacon. Instead, at block 1106, the interfering node may elect to reduce transmit power during the designated time period, reduce data transmission rate during the time period, use different coding during the time period, or perform or abstain from performing some other related operation.

As represented by block 1108, in the event the interference is not substantially minimal, the interfering node may elect to obey the back-off beacon. That is, the interfering node may refrain from transmitting on the corresponding carrier for the designated period of time (e.g., delay the transmission of data until after the time period expires).

Referring again to FIG. 10, block 1010 relates to a scenario where the received signal is a synchronous interference management message and the interfering node is a synchronous interferer to the receiving node. In this case, the interfering node (e.g., the interference controller 332) may also elect to react to the received signal (e.g., by limiting its transmission). Here, the limiting of transmission may include, for example, one or more of abstaining from transmitting during a timeslot (e.g., delaying data transmission), reducing transmit power during a timeslot, reducing data transmission rate during a timeslot, using different coding during a timeslot, or performing or abstaining from performing some other related operation.

If neither of the conditions of blocks 1008 and 1010 is met, the interfering node may elect to ignore the received signal at block 1012. For example, the interfering node may ignore the received signal if the received signal is a synchronous interference management message and the interfering node is an asynchronous interferer to the receiving node. Similarly, the interfering node may ignore the received signal if the received signal is an asynchronous interference management message and the interfering node is a synchronous interferer to the receiving node.

Figure 12:
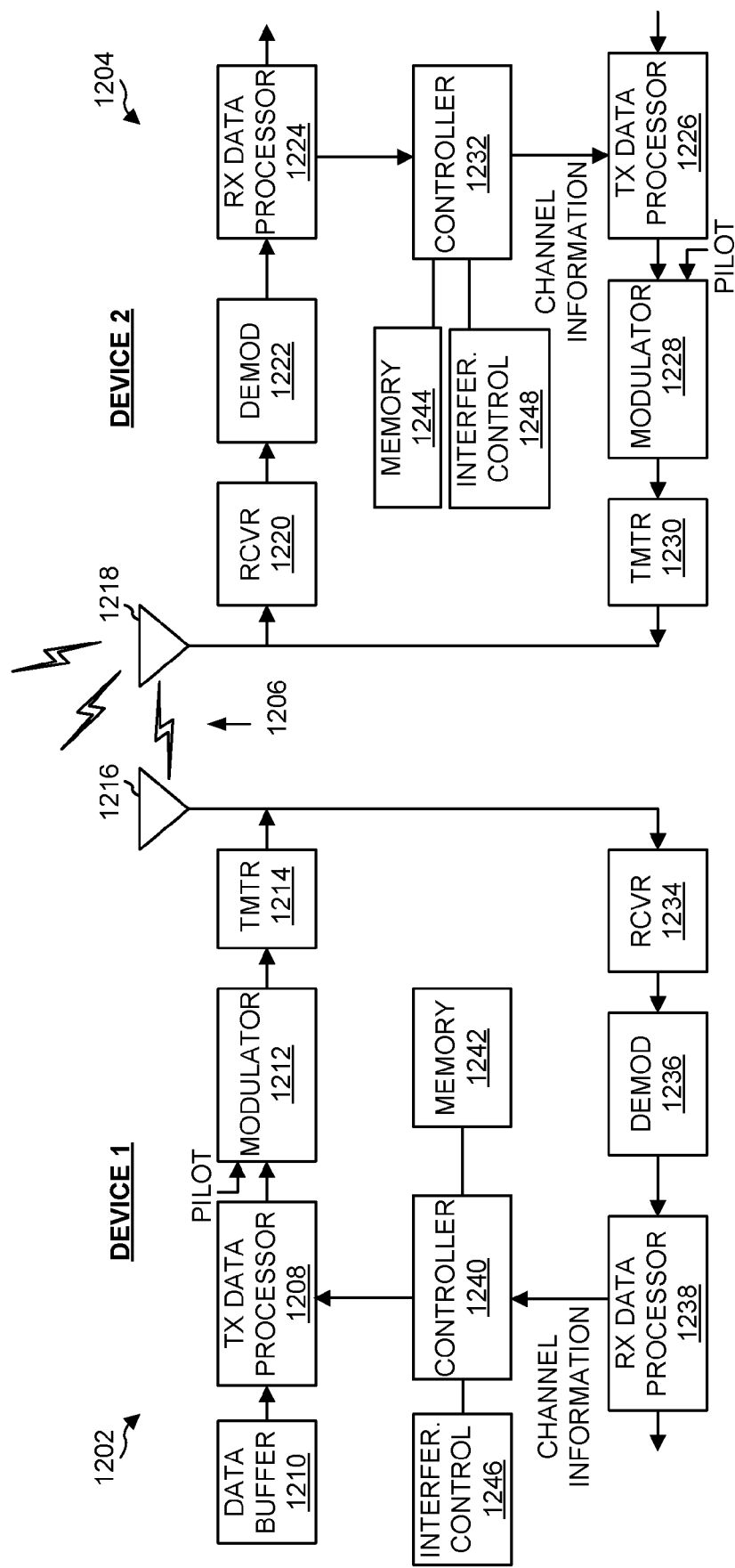
FIG. 12 is a simplified block diagram of several sample aspects of communication components.
Figure 13A:
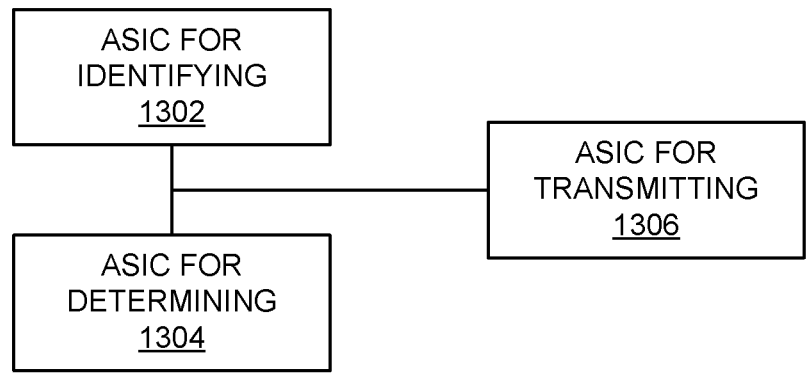
FIGS. 13A-13E are simplified block diagrams of several sample aspects of apparatuses configured to provide interference management as taught herein.
Figure 13B:
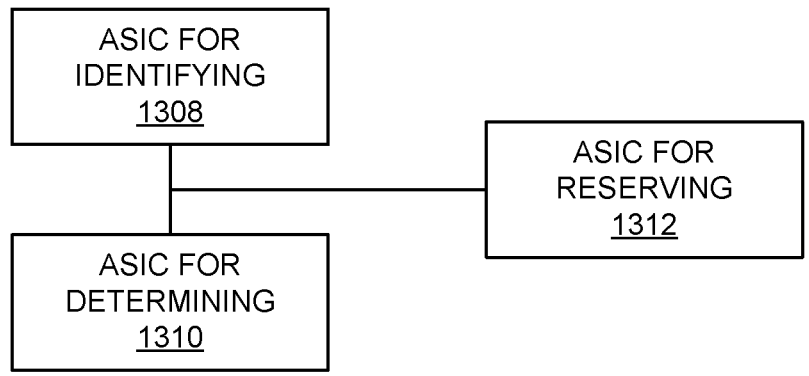
Figure 13C:
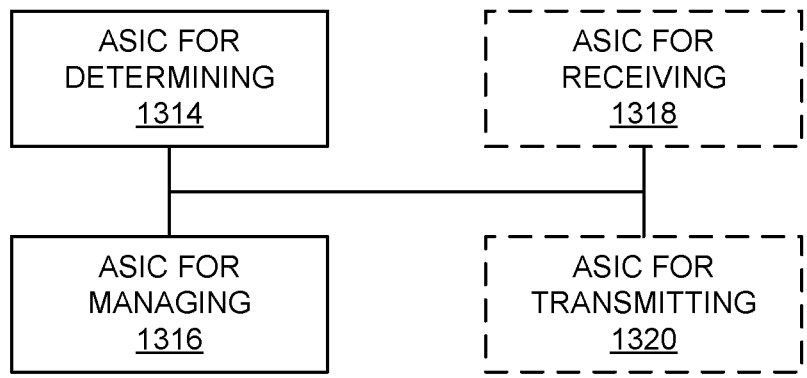
Figure 13D:
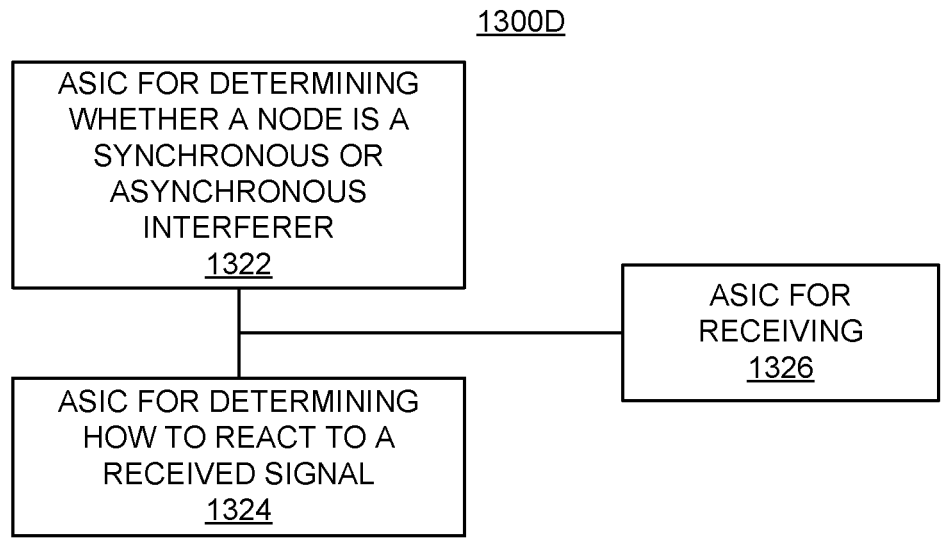
Figure 13E:
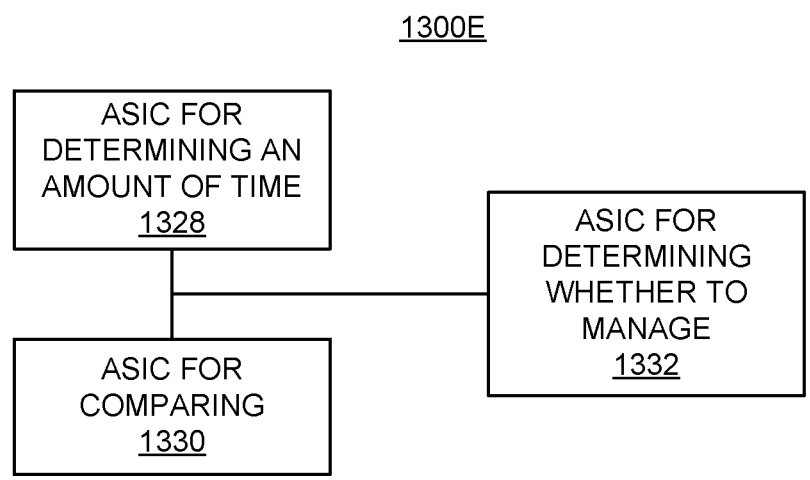

The teachings herein may be incorporated into a device employing various components for communicating with at least one other wireless device. FIG. 12 depicts several sample components that may be employed to facilitate communication between devices. Here, a first device 1202 (e.g., an access terminal) and a second device 1204 (e.g., an access point) are adapted to communicate via a wireless communication link 1206 over a suitable medium.

Initially, components involved in sending information from the device 1202 to the device 1204 (e.g., a reverse link) will be treated. A transmit ("TX") data processor 1208 receives traffic data (e.g., data packets) from a data buffer 1210 or some other suitable component. The transmit data processor 1208 processes (e.g., encodes, interleaves, and symbol maps) each data packet based on a selected coding and modulation scheme, and provides data symbols. In general, a data symbol is a modulation symbol for data, and a pilot symbol is a modulation symbol for a pilot (which is known a priori). A modulator 1212 receives the data symbols, pilot symbols, and possibly signaling for the reverse link, and performs modulation (e.g., OFDM or some other suitable modulation) and/or other processing as specified by the system, and provides a stream of output chips. A transmitter ("TMTR") 1214 processes (e.g., converts to analog, filters, amplifies, and frequency upconverts) the output chip stream and generates a modulated signal, which is then transmitted from an antenna 1216.

The modulated signals transmitted by the device 1202 (along with signals from other devices in communication with the device 1204) are received by an antenna 1218 of the device 1204. A receiver ("RCVR") 1220 processes (e.g., conditions and digitizes) the received signal from the antenna 1218 and provides received samples. A demodulator ("DEMOD") 1222 processes (e.g., demodulates and detects) the received samples and provides detected data symbols, which may be a noisy estimate of the data symbols transmitted to the device 1204 by the other device(s). A receive ("RX") data processor 1224 processes (e.g., symbol demaps, deinterleaves, and decodes) the detected data symbols and provides decoded data associated with each transmitting device (e.g., device 1202).

Components involved in sending information from the device 1204 to the device 1202 (e.g., a forward link) will be now be treated. At the device 1204, traffic data is processed by a transmit ("TX") data processor 1226 to generate data symbols. A modulator 1228 receives the data symbols, pilot symbols, and signaling for the forward link, performs modulation (e.g., OFDM or some other suitable modulation) and/or other pertinent processing, and provides an output chip stream, which is further conditioned by a transmitter ("TMTR") 1230 and transmitted from the antenna 1218. In some implementations signaling for the forward link may include power control commands and other information (e.g., relating to a communication channel) generated by a controller 1232 for all devices (e.g. terminals) transmitting on the reverse link to the device 1204.

At the device 1202, the modulated signal transmitted by the device 1204 is received by the antenna 1216, conditioned and digitized by a receiver ("RCVR") 1234, and processed by a demodulator ("DEMOD") 1236 to obtain detected data symbols. A receive ("RX") data processor 1238 processes the detected data symbols and provides decoded data for the device 1202 and the forward link signaling. A controller 1240 receives power control commands and other information to control data transmission and to control transmit power on the reverse link to the device 1204.

The controllers 1240 and 1232 direct various operations of the device 1202 and the device 1204, respectively. For example, a controller may determine an appropriate filter, reporting information about the filter, and decode information using a filter. Data memories 1242 and 1244 may store program codes and data used by the controllers 1240 and 1232, respectively.

FIG. 12 also illustrates that the communication components may include one or more components that perform interference management operations as taught herein. For example, an interference ("INTERFER.") control component 1246 may cooperate with the controller 1240 and/or other components of the device 1202 to manage interference as taught herein. Similarly, an interference control component 1248 may cooperate with the controller 1232 and/or other components of the device 1204 to manage interference. In some cases, two or more of the above components may be implemented in a single component. For example, a common component (e.g., a processor) may perform the functions of blocks 1240 and 1246 and a common component may perform the functions of blocks 1232 and 1248.

The teachings herein may be incorporated into (e.g., implemented within or performed by) a variety of apparatuses (e.g., devices). For example, each node may be configured, or referred to in the art, as an access point ("AP"), NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology. Certain nodes also may be referred to as access terminals. An access terminal also may be known as a subscriber station, a subscriber unit, a mobile station, a remote station, a remote terminal, a user terminal, a user agent, a user device, or user equipment. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless medium.

As mentioned above, in some aspects a wireless node may comprise an access device (e.g., a cellular or Wi-Fi access point) for a communication system. Such an access device may provide, for example, connectivity for or to a network (e.g., a wide area network such as the Internet or a cellular network) via a wired or wireless communication link. Accordingly, the access device may enable another device (e.g., a Wi-Fi station) to access the network or some other functionality.

A wireless node may thus include various components that perform functions based on data transmitted by or received at the wireless node via a communication link. For example, an access point and an access terminal may include an antenna for transmitting and receiving signals (e.g., interference signals or indications relating to control and/or data. An access point also may include a traffic manager configured to manage data traffic flows that its receiver receives from a plurality of wireless nodes or that its transmitter transmits to a plurality of wireless nodes. In addition, an access terminal may include a user interface (e.g., coupled to a processor or controller) configured to output an indication based on received data (e.g., at least one received flow, data received using a reserved resource, via a channel, via a receiver, via a communication link, etc.).

A wireless device may communicate via one or more wireless communication links that are based on or otherwise support any suitable wireless communication technology. For example, in some aspects a wireless device may associate with a network. In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., transmitters 316 and 320 and receivers 322 and 328) that may include various components (e.g., signal generators and signal processors) that facilitate communication over a wireless medium.

The components described herein may be implemented in a variety of ways. Referring to FIGS. 13A-13E, apparatuses 1300A-1300E are represented as a series of interrelated functional blocks that may represent functions implemented by, for example, one or more integrated circuits (e.g., an ASIC) or may be implemented in some other manner as taught herein. As discussed herein, an integrated circuit may include a processor, software, other components, or some combination thereof The apparatuses 1300A-1300E may include one or more modules that may perform one or more of the functions described above with regard to various figures. For example, an ASIC for identifying 1302 may correspond to, for example, a flow identifier as discussed herein. An ASIC for determining 1304 may correspond to, for example, a resource processor as discussed herein. An ASIC for transmitting 1306 or 1320 may correspond to, for example, a transmitter as discussed herein. An ASIC for identifying 1308 may correspond to, for example, an interference identifier as discussed herein. An ASIC for determining 1310 may correspond to, for example, a resource processor as discussed herein. An ASIC for reserving 1312 may correspond to, for example, an interference controller as discussed herein. An ASIC for determining 1314 may correspond to, for example, an interference determiner as discussed herein. An ASIC for managing 1316 may correspond to, for example, an interference controller as discussed herein. An ASIC for receiving 1318 or 1326 may correspond to, for example, a receiver as discussed herein. An ASIC for determining 1322 may correspond to, for example, an interference determiner as discussed herein. An ASIC for determining 1324 may correspond to, for example, an interference controller as discussed herein. An ASIC for determining 1328 may correspond to, for example, a timer as discussed herein. An ASIC for comparing 1330 may correspond to, for example, a comparator as discussed herein. An ASIC for determining 1332 may correspond to, for example, an interference controller as discussed herein.

As noted above, in some aspects these components may be implemented via appropriate processor components. These processor components may in some aspects be implemented, at least in part, using structure as taught herein. In some aspects a processor may be adapted to implement a portion or all of the functionality of one or more of these components. In some aspects one or more of the components represented by dashed boxes are optional.

As noted above, the apparatuses 1300A-1300E may comprise one or more integrated circuits. For example, in some aspects a single integrated circuit may implement the functionality of one or more of the illustrated components, while in other aspects more than one integrated circuit may implement the functionality of one or more of the illustrated components.

In addition, the components and functions represented by FIGS. 13A-13E as well as other components and functions described herein, may be implemented using any suitable means. Such means also may be implemented, at least in part, using corresponding structure as taught herein. For example, the components described above in conjunction with the "ASIC for" components of FIGS. 13A-13E also may correspond to similarly designated "means for" functionality. Thus, in some aspects one or more of such means may be implemented using one or more of processor components, integrated circuits, or other suitable structure as taught herein.

Also, it should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., executable by at least one computer) relating to one or more of the aspects of the disclosure. In some aspects a computer program product may comprise packaging materials.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of wireless communication, comprising:
   determining, by an apparatus, whether an interferer is a synchronous interferer to the apparatus or an asynchronous interferer to the apparatus; and
   managing, by the apparatus, interference from the interferer based on the determination, wherein the interference is managed without determining an identity of the interferer and the management of interference comprises:
   upon determining that the interferer is a synchronous interferer, electing to mitigate the interference to the apparatus by causing the interferer to limit interfering transmissions and, as a result of the election, generating and broadcasting a synchronous interference management signal intended for the interferer; and
   upon determining that the interferer is an asynchronous interferer, electing to mitigate the interference to the apparatus by causing the interferer to limit interfering transmissions and, as a result of the election, generating and broadcasting an asynchronous interference management signal intended for the interferer.

2. The method of claim 1, wherein the determination of whether the interferer is a synchronous interferer or an asynchronous interferer comprises comparing timing of received signals with expected timing of signals associated with synchronous operation.

3. The method of claim 2, wherein the received signals comprise acquisition signals.

4. The method of claim 1, wherein the determination of whether the interferer is a synchronous interferer or an asynchronous interferer comprises determining whether received signals are synchronous interference management signals or asynchronous interference management signals.

5. The method of claim 1, wherein:
   the synchronous interference management signal comprises time division multiplexed signaling; and
   the asynchronous interference management signal comprises frequency division multiplexed signaling.

6. The method of claim 1, wherein:
   the determination of whether the interferer is a synchronous interferer or an asynchronous interferer comprises determining that the interferer is a synchronous interferer; and
   the method further comprises determining that another interferer is an asynchronous interferer and transmitting an asynchronous interference management signal to manage the asynchronous interferer.

7. The method of claim 1, wherein the management of interference comprises managing asynchronous interference by performing at least one of the group consisting of: marking received signals as erasures and adjusting coding associated with processing of received signals.

8. The method of claim 1, wherein the management of interference comprises managing asynchronous interference by determining whether to switch to a carrier with lower interference.

9. The method of claim 8, wherein the determination of whether to switch to a carrier with lower interference is based on at least one of the group consisting of: a level of interference on the carrier, a quantity of interferers transmitting on the carrier, prior use of the carrier, preferred use of the carrier, and whether another carrier also would be utilized.

10. The method of claim 1, wherein the management of interference comprises managing asynchronous interference by electing to use a time division multiplexing interference management scheme if a determination is made to not switch to a carrier with lower interference.

11. The method of claim 1, wherein the management of interference comprises managing asynchronous interference by metering transmissions of interference management signals.

12. The method of claim 11, wherein the metering is based on at least one of the group consisting of: whether an interference management signal has been transmitted, whether there has been an uncontested transmission on a carrier, and a determined share of resources.

13. The method of claim 1, wherein the management of interference comprises managing asynchronous interference by determining how often to transmit back-off beacons.

14. The method of claim 13, wherein each of the back-off beacons requests use of a resource for a defined period of time.

15. The method of claim 14, wherein the defined period of time is specified by at least one of the back-off beacons or by a separately transmitted signal.

16. An apparatus for wireless communication, comprising:
an interference determiner adapted to determine whether an interferer is a synchronous interferer to the apparatus or an asynchronous interferer to the apparatus; and
an interference controller adapted to manage interference from the interferer based on the determination, wherein the interference is managed without a determination of an identity of the interferer and, to manage interference, the interference controller is further adapted to:
upon a determination that the interferer is a synchronous interferer, elect to mitigate the interference to the apparatus and cause the interferer to limit interfering transmissions to mitigate the interference and, as a result of the election, generate and broadcast a synchronous interference management signal intended for the interferer; and
upon a determination that the interferer is an asynchronous interferer, elect to mitigate the interference to the apparatus and cause the interferer to limit interfering transmissions to mitigate the interference and, as a result of the election, generate and broadcast an asynchronous interference management signal intended for the interferer.

17. The apparatus of claim 16, further comprising a receiver adapted to receive signals, wherein to determine whether the interferer is a synchronous interferer or an asynchronous interferer, the interference determiner is further adapted to compare timing of the received signals with expected timing of signals associated with synchronous operation.

18. The apparatus of claim 17, wherein the received signals comprise acquisition signals.

19. The apparatus of claim 16, further comprising a receiver adapted to receive signals, wherein to determine whether the interferer is a synchronous interferer or an asynchronous interferer, the interference determiner is further adapted to determine whether the received signals are synchronous interference management signals or asynchronous interference management signals.

20. The apparatus of claim 16, wherein:
the synchronous interference management signal comprises time division multiplexed signaling; and
the asynchronous interference management signal comprises frequency division multiplexed signaling.

21. The apparatus of claim 16, wherein:
the determination of whether the interferer is a synchronous interferer or an asynchronous interferer comprises a determination that the interferer is a synchronous interferer;
the interference determiner is further adapted to determine that another interferer is an asynchronous interferer; and
the apparatus further comprises a transmitter adapted to transmit a synchronous interference management signal to manage the synchronous interferer and an asynchronous interference management signal to manage the asynchronous interferer.

22. The apparatus of claim 16, wherein the management of interference comprises management of asynchronous interference and, to manage the asynchronous interference, the interference controller is further adapted to perform at least one of the group consisting of: mark received signals as erasures and adjust coding associated with processing of received signals.

23. The apparatus of claim 16, wherein the management of interference comprises management of asynchronous interference and, to manage the asynchronous interference, the interference controller is further adapted to determine whether to switch to a carrier with lower interference.

24. The apparatus of claim 23, wherein the determination of whether to switch to a carrier with lower interference is based on at least one of the group consisting of: a level of interference on the carrier, a quantity of interferers transmitting on the carrier, prior use of the carrier, preferred use of the carrier, and whether another carrier also would be utilized.

25. The apparatus of claim 16, wherein the management of interference comprises management of asynchronous interference and, to manage the asynchronous interference, the interference controller is further adapted to elect to use a time division multiplexing interference management scheme if a determination is made to not switch to a carrier with lower interference.

26. The apparatus of claim 16, wherein the management of interference comprises management of asynchronous interference and, to manage the asynchronous interference, the interference controller is further adapted to meter transmissions of interference management signals.

27. The apparatus of claim 26, wherein the interference controller is further adapted to meter the transmissions based on at least one of the group consisting of: whether an interference management signal has been transmitted, whether there has been an uncontested transmission on a carrier, and a determined share of resources.

28. The apparatus of claim 16, wherein the management of interference comprises management of asynchronous interference and, to manage the asynchronous interference, the interference controller is further adapted to determine how often to transmit back-off beacons.

29. The apparatus of claim 28, wherein each of the back-off beacons requests use of a resource for a defined period of time.

30. The apparatus of claim 29, wherein the defined period of time is specified by at least one of the back-off beacons or by a separately transmitted signal.

31. An apparatus for wireless communication, comprising:
means for determining whether an interferer is a synchronous interferer to the apparatus or an asynchronous interferer to the apparatus; and
means for managing interference from the interferer based on the determination, wherein the interference is managed without a determination of an identity of the interferer and, to manage interference, the means for managing interference is adapted to:
upon a determination that the interferer is a synchronous interferer, elect to mitigate the interference to the apparatus and cause the interferer to limit interfering transmissions to mitigate the interference and, as a result of the election, generate and broadcast a synchronous interference management signal intended for the interferer; and
upon a determination that the interferer is an asynchronous interferer, elect to mitigate the interference to the apparatus and cause the interferer to limit interfering transmissions to mitigate the interference and, as a result of the election, generate and broadcast an asynchronous interference management signal intended for the interferer.

32. The apparatus of claim 31, further comprising means for receiving signals, wherein to determine whether the interferer is a synchronous interferer or an asynchronous interferer, the means for determining is adapted to compare timing of the received signals with expected timing of signals associated with synchronous operation.

33. The apparatus of claim 32, wherein the received signals comprise acquisition signals.

34. The apparatus of claim 31, further comprising means for receiving signals, wherein to determine whether the interferer is a synchronous interferer or an asynchronous interferer, the means for determining is adapted to determine whether the received signals are synchronous interference management signals or asynchronous interference management signals.

35. The apparatus of claim 31, wherein:
the synchronous interference management signal comprises time division multiplexed signaling; and
the asynchronous interference management signal comprises frequency division multiplexed signaling.

36. The apparatus of claim 31, wherein:
the determination of whether the interferer is a synchronous interferer or an asynchronous interferer comprises a determination that the interferer is a synchronous interferer;
the means for determining is adapted to determine that another interferer is an asynchronous interferer; and
the apparatus further comprises means for transmitting a synchronous interference management signal to manage the synchronous interferer and an asynchronous interference management signal to manage the asynchronous interferer.

37. The apparatus of claim 31, wherein the management of interference comprises management of asynchronous interference and, to manage the asynchronous interference, the means for managing interference is adapted to perform at least one of the group consisting of: mark received signals as erasures and adjust coding associated with processing of received signals.

38. The apparatus of claim 31, wherein the management of interference comprises management of asynchronous interference and, to manage the asynchronous interference, the means for managing interference is adapted to determine whether to switch to a carrier with lower interference.

39. The apparatus of claim 38, wherein the determination of whether to switch to a carrier with lower interference is based on at least one of the group consisting of: a level of interference on the carrier, a quantity of interferers transmitting on the carrier, prior use of the carrier, preferred use of the carrier, and whether another carrier also would be utilized.

40. The apparatus of claim 31, wherein the management of interference comprises management of asynchronous interference and, to manage the asynchronous interference, the means for managing interference is adapted to elect to use a time division multiplexing interference management scheme if a determination is made to not switch to a carrier with lower interference.

41. The apparatus of claim 31, wherein the management of interference comprises management of asynchronous interference and, to manage the asynchronous interference, the means for managing interference is adapted to meter transmissions of interference management signals.

42. The apparatus of claim 41, wherein the means for managing interference is further adapted to meter the transmissions based on at least one of the group consisting of: whether an interference management signal has been transmitted, whether there has been an uncontested transmission on a carrier, and a determined share of resources.

43. The apparatus of claim 31, wherein the management of interference comprises management of asynchronous interference and, to manage the asynchronous interference, the means for managing interference is adapted to determine how often to transmit back-off beacons.

44. The apparatus of claim 43, wherein each of the back-off beacons requests use of a resource for a defined period of time.

45. The apparatus of claim 44, wherein the defined period of time is specified by at least one of the back-off beacons or by a separately transmitted signal.

46. A computer-program product for wireless communication, comprising:
computer-readable storage device encoded with codes executable to:
determine, by an apparatus, whether an interferer is a synchronous interferer to the apparatus or an asynchronous interferer to the apparatus; and
manage, by the apparatus, interference from the interferer based on the determination, wherein the interference is managed without determining an identity of the interferer and the codes executable to manage interference further comprise codes executable to:
upon determining that the interferer is a synchronous interferer, electing to mitigate the interference to the apparatus by causing the interferer to limit interfering transmissions and, as a result of the election, generating and broadcasting a synchronous interference management signal intended for the interferer; and
upon determining that the interferer is an asynchronous interferer, electing to mitigate the interference to the apparatus by causing the interferer to limit interfering transmissions and, as a result of the election, generating and broadcasting an asynchronous interference management signal intended for the interferer.

47. An access point, comprising:
an antenna;
an interference determiner adapted to determine whether an interferer is a synchronous interferer to the access point or an asynchronous interferer to the access point based on signals received via the antenna; and
an interference controller adapted to manage interference from the interferer based on the determination, wherein the interference is managed without a determination of an identity of the interferer and, to manage interference, the interference controller is further adapted to:
upon a determination that the interferer is a synchronous interferer, elect to mitigate the interference to the access point and cause the interferer to limit interfering transmissions to mitigate the interference and, as a result of the election, generate and broadcast a synchronous interference management signal intended for the interferer; and
upon a determination that the interferer is an asynchronous interferer, elect to mitigate the interference to the access point and cause the interferer to limit interfering transmissions to mitigate the interference and, as a result of the election, generate and broadcast an asynchronous interference management signal intended for the interferer.

48. An access terminal, comprising:
an interference determiner adapted to determine whether an interferer on a carrier is a synchronous interferer to the access terminal or an asynchronous interferer to the access terminal;
an interference controller adapted to manage interference from the interferer based on the determination; and
a user interface configured to output an indication based on data received via the carrier,
wherein the interference is managed without a determination of an identity of the interferer and, to manage interference, the interference controller is further adapted to:
upon a determination that the interferer is a synchronous interferer, elect to mitigate the interference to the access terminal and cause the interferer to limit interfering transmissions to mitigate the interference and, as a result of the election, generate and broadcast a synchronous interference management signal intended for the interferer; and
upon a determination that the interferer is an asynchronous interferer, elect to mitigate the interference to the access terminal and cause the interferer to limit interfering transmissions to mitigate the interference and, as a result of the election, generate and broadcast an asynchronous interference management signal intended for the interferer.

49. A method of wireless communication, comprising:
receiving a radiofrequency signal at a first apparatus, wherein the received signal comprises an interference management signal transmitted by a second apparatus to mitigate interference at the second apparatus;
determining, by the first apparatus, whether the first apparatus is a synchronous or asynchronous interferer to the second apparatus based on the received signal; and
selecting, by the first apparatus, an interference management technique to be used by the first apparatus to react to the received signal, wherein the selection is based on the determination.

50. The method of claim 49, wherein the determination of whether the first apparatus is a synchronous or asynchronous interferer comprises comparing timing of the received signal with expected timing of signals associated with synchronous operation.

51. The method of claim 49, wherein the determination of whether the first apparatus is a synchronous or asynchronous interferer comprises determining whether the received signal is a synchronous interference management signal or an asynchronous interference management signal.

52. The method of claim 49, wherein the selection of an interference management technique comprises determining to limit transmissions for a defined period of time associated with the received signal.

53. The method of claim 52, wherein the determination to limit transmissions comprises at least one of the group consisting of: determining to delay transmissions, determining to reduce transmission rate, determining to reduce transmit power, and determining to change coding associated with transmission.

54. The method of claim 49, wherein the selection of an interference management technique comprises determining to react to the received signal if the first apparatus is a synchronous interferer and the received signal is a synchronous interference management signal.

55. The method of claim 49, wherein the selection of an interference management technique comprises determining not to react to the received signal if the first apparatus is a synchronous interferer and the received signal is an asynchronous interference management signal.

56. The method of claim 49, wherein the selection of an interference management technique comprises determining to react to the received signal if the first apparatus is an asynchronous interferer and the received signal is an asynchronous interference management signal.

57. The method of claim 49, wherein the selection of an interference management technique comprises determining not to react to the received signal if the first apparatus is an asynchronous interferer and the received signal is a synchronous interference management signal.

58. The method of claim 49, wherein the received signal comprises a back-off beacon.

59. The method of claim 58, wherein the interference management technique comprises refraining from transmitting on a resource for a defined period of time as a result of receiving the back-off beacon.

60. The method of claim 59, wherein the defined period of time is specified by the back-off beacon or by a separately transmitted signal.

61. An apparatus for wireless communication, comprising:
a receiver adapted to receive a radiofrequency signal, wherein the received signal comprises an interference management signal transmitted by another apparatus to mitigate interference at the other apparatus;
an interference determiner adapted to determine whether the apparatus is a synchronous or asynchronous interferer to the other apparatus based on the received signal; and
an interference controller adapted to select an interference management technique to be used by the apparatus to react to the received signal, wherein the selection is based on the determination.

62. The apparatus of claim 61, wherein to determine whether the apparatus is a synchronous or asynchronous interferer, the interference determiner is further adapted to compare timing of the received signal with expected timing of signals associated with synchronous operation.

63. The apparatus of claim 61, wherein to determine whether the apparatus is a synchronous or asynchronous interferer, the interference determiner is further adapted to determine whether the received signal is a synchronous interference management signal or an asynchronous interference management signal.

64. The apparatus of claim 61, wherein to select the interference management technique, the interference controller is further adapted to determine to limit transmissions for a defined period of time associated with the received signal.

65. The apparatus of claim 64, wherein the determination to limit transmissions comprises at least one of the group consisting of: determine to delay transmissions, determine to reduce transmission rate, determine to reduce transmit power, and determine to change coding associated with transmission.

66. The apparatus of claim 61, wherein to select the interference management technique, the interference controller is further adapted to determine to react to the received signal if the apparatus is a synchronous interferer and the received signal is a synchronous interference management signal.

67. The apparatus of claim 61, wherein to select the interference management technique, the interference controller is further adapted to determine not to react to the received signal if the apparatus is a synchronous interferer and the received signal is an asynchronous interference management signal.

68. The apparatus of claim 61, wherein to select the interference management technique, the interference controller is further adapted to determine to react to the received signal if the apparatus is an asynchronous interferer and the received signal is an asynchronous interference management signal.

69. The apparatus of claim 61, wherein to select the interference management technique to react, the interference controller is further adapted to determine not to react to the received signal if the apparatus is an asynchronous interferer and the received signal is a synchronous interference management signal.

70. The apparatus of claim 61, wherein the received signal comprises a back-off beacon.

71. The apparatus of claim 70, wherein the interference management technique comprises refrain from transmitting on a resource for a defined period of time as a result of receipt of the back-off beacon.

72. The apparatus of claim 71, wherein the defined period of time is specified by the back-off beacon or by a separately transmitted signal.

73. An apparatus for wireless communication, comprising:
means for receiving a radiofrequency signal, wherein the received signal comprises an interference management signal transmitted by another apparatus to mitigate interference at the other apparatus;
means for determining whether the apparatus is a synchronous or asynchronous interferer to the other apparatus based on the received signal; and
means for selecting an interference management technique to be used by the apparatus to react to the received signal, wherein the selection is based on the determination.

74. The apparatus of claim 73, wherein to determine whether the apparatus is a synchronous or asynchronous interferer, the means for determining is adapted to compare timing of the received signal with expected timing of signals associated with synchronous operation.

75. The apparatus of claim 73, wherein to determine whether the apparatus is a synchronous or asynchronous interferer, the means for determining is adapted to determine whether the received signal is a synchronous interference management signal or an asynchronous interference management signal.

76. The apparatus of claim 73, wherein to select the interference management technique, the means for selecting is adapted to determine to limit transmissions for a defined period of time associated with the received signal.

77. The apparatus of claim 76, wherein the determination to limit transmissions comprises at least one of the group consisting of: determine to delay transmissions, determine to reduce transmission rate, determine to reduce transmit power, and determine to change coding associated with transmission.

78. The apparatus of claim 73, wherein to select the interference management technique, the means for selecting is adapted to determine to react to the received signal if the apparatus is a synchronous interferer and the received signal is a synchronous interference management signal.

79. The apparatus of claim 73, wherein to select the interference management technique, the means for selecting is adapted to determine not to react to the received signal if the apparatus is a synchronous interferer and the received signal is an asynchronous interference management signal.

80. The apparatus of claim 73, wherein to select the interference management technique, the means for selecting is adapted to determine to react to the received signal if the apparatus is an asynchronous interferer and the received signal is an asynchronous interference management signal.

81. The apparatus of claim 73, wherein to select the interference management technique to react, the means for selecting is adapted to determine not to react to the received signal if the apparatus is an asynchronous interferer and the received signal is a synchronous interference management signal.

82. The apparatus of claim 73, wherein the received signal comprises a back-off beacon.

83. The apparatus of claim 82, wherein the interference management technique comprises refrain from transmitting on a resource for a defined period of time as a result of receipt of the back-off beacon.

84. The apparatus of claim 83, wherein the defined period of time is specified by the back-off beacon or by a separately transmitted signal.

85. A computer-program product for wireless communication, comprising:
computer-readable storage device encoded with codes executable to:
receive a radiofrequency signal at a first apparatus, wherein the received signal comprises an interference management signal transmitted by a second apparatus to mitigate interference at the second apparatus;
determine, at the first apparatus, whether the first apparatus is a synchronous or asynchronous interferer to the second apparatus based on the received signal; and
select, at the first apparatus, an interference management technique to be used by the first apparatus to react to the received signal, wherein the selection is based on the determination.

86. An access point, comprising:
an antenna;
a receiver adapted to receive a radiofrequency signal via the antenna, wherein the received signal comprises an interference management signal transmitted by an apparatus to mitigate interference at the apparatus;
an interference determiner adapted to determine whether the access point is a synchronous or asynchronous interferer to the apparatus based on the received signal; and
an interference controller adapted to select an interference management technique to be used by the access point to react to the received signal, wherein the selection is based on the determination.

87. An access terminal, comprising:
a receiver adapted to receive a radiofrequency signal, wherein the received signal comprises an interference management signal transmitted by an apparatus to mitigate interference at the apparatus;
an interference determiner adapted to determine whether the access terminal is a synchronous or asynchronous interferer to the apparatus based on the received signal;
an interference controller adapted to select an interference management technique to be used by the access terminal to react to the received signal, wherein the selection is based on the determination; and
a user interface configured to output an indication based on data received via the receiver.

88. An apparatus for wireless communication, comprising:
an interference determiner adapted to determine whether an interferer is a synchronous interferer or an asynchronous interferer; and
an interference controller adapted to manage interference associated with the interferer based on the determination, wherein to manage the interference, the interference controller is further adapted to:
use a first type of signal to manage synchronous interference, the first type of signal comprising time division multiplexed signaling;
use a second type of signal to manage asynchronous interference, the second type of signal comprising frequency division multiplexed signaling; and
manage asynchronous interference based on an election to use a time division multiplexing interference management scheme if a determination is made to not switch to a carrier with lower interference.

* * * * *